(12) United States Patent
Choi et al.

(10) Patent No.: US 12,385,879 B2
(45) Date of Patent: Aug. 12, 2025

(54) TENDON DIAGNOSIS DEVICE USING INDUCED VOLTAGE MEASUREMENT, AND BRIDGE CABLE DIAGNOSIS SYSTEM USING SAME

(71) Applicant: KOREA INSTITUTE OF CIVIL ENGINEERING AND BUILDING TECHNOLOGY, Goyang-si (KR)

(72) Inventors: Ji-Young Choi, Goyang-si (KR); Hungjoo Kwon, Changwon-si (KR); Im-Jong Kwahk, Paju-si (KR); Changbin Joh, Seoul (KR); Kwang-Yeun Park, Seoul (KR); Won-Jong Chin, Seoul (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 127 days.

(21) Appl. No.: 18/569,974

(22) PCT Filed: Jun. 29, 2022

(86) PCT No.: PCT/KR2022/009276
§ 371 (c)(1),
(2) Date: Dec. 13, 2023

(87) PCT Pub. No.: WO2023/277554
PCT Pub. Date: Jan. 5, 2023

(65) Prior Publication Data
US 2024/0280538 A1   Aug. 22, 2024

(30) Foreign Application Priority Data
Jul. 1, 2021 (KR) .................. 10-2021-0086296

(51) Int. Cl.
*G01N 27/82* (2006.01)
*B25J 5/02* (2006.01)
*G01N 35/00* (2006.01)

(52) U.S. Cl.
CPC ................ *G01N 27/82* (2013.01); *B25J 5/02* (2013.01); *G01N 35/0099* (2013.01)

(58) Field of Classification Search
CPC ........ G01N 27/82; G01N 35/0099; B25J 5/02
See application file for complete search history.

(56) References Cited

U.S. PATENT DOCUMENTS

2020/0256832 A1*  8/2020  Seavey .................. G01N 27/87

FOREIGN PATENT DOCUMENTS

| CN | 110108790 A | 8/2019 |
|---|---|---|
| JP | 2556957 Y2 | 12/1997 |
| JP | 3545369 B2 | 7/2004 |
| JP | 2020-183897 A | 11/2020 |
| KR | 10-1192286 B1 | 10/2012 |
| KR | 10-1590830 B1 | 2/2016 |

(Continued)

*Primary Examiner* — Minh Q Phan
(74) *Attorney, Agent, or Firm* — Goldilocks Zone IP Law

(57) ABSTRACT

The present invention relates to: a device that applies an induced magnetic field to a tendon, measures changes that occur in the induced magnetic field due to damage to the tendon or changes in sectional force in the tendon, and/or measures the induced voltage induced by the changes in the induced magnetic field, and diagnoses the tendon; and a bridge cable diagnosis system using same.

7 Claims, 24 Drawing Sheets

(56) References Cited

FOREIGN PATENT DOCUMENTS

| KR | 10-1851346 B1 | 4/2018 |
| KR | 10-1973067 B1 | 8/2019 |
| KR | 10-2178721 B1 | 11/2020 |
| KR | 10-2292726 B1 | 8/2021 |

* cited by examiner

TENDON DIAGNOSIS DEVICE USING INDUCED VOLTAGE MEASUREMENT, AND BRIDGE CABLE DIAGNOSIS SYSTEM USING SAME

CROSS-REFERENCE TO RELATED APPLICATIONS

This application claims the benefit under 35 U.S.C. section 371, of PCT International Application No. PCT/KR2022/009276, filed on Jun. 29, 2022, which claims priority to Korean Patent Application No. 10-2021-0086296, filed on Jul. 1, 2021, in the Korean Intellectual Property Office, both of which are hereby incorporated by reference in their entireties.

TECHNICAL FIELD

The present invention relates to a device for diagnosing a state of a tendon and a system for diagnosing a state of a bridge cable configured by the tendon by using the device.

BACKGROUND ART

In general, a tendon includes a bundle of stranded tensioning wires to provide tension. The tendon is used for cables for a bridge or a tension member of prestressed concrete.

In general, tensile stress is applied to the tendon. The tendon is mainly used for a structurally important member. A change in stress applied to the tendon (sectional force of the tendon) due to corrosion or the like significantly affects performance of a structure member. Therefore, it is very important to measure the sectional force of the tendon. In addition, it is very important to recognize whether the sectional force of the tendon changes.

Korean Patent No. 10-1590830 discloses a technology for measuring a change in sectional force of a tendon by applying a magnetic field to the tendon. The technology disclosed in Korean Patent No. 10-1590830 uses an inverse magnetostriction effect. Korean Patent No. 10-1851346 discloses a technology capable of installing a solenoid coil outside a tendon. Korean Patent No. 10-2178721 discloses a technology for detecting damage to a tendon. In the technology disclosed in Korean Patent No. 10-2178721, a magnetic field is applied to the tendon, and then induced voltage, which is generated by a change in magnetic field that occurs on a damaged portion of the tendon, is measured. Whether the tendon is damaged is recognized on the basis of the measured induced voltage.

A process of recognizing whether a sectional force of the tendon changes, a process of testing whether the tendon is damaged, a process of recognizing a degree to which the tendon is damaged, a process of recognizing a position at which the tendon is damaged are all included in <diagnosis for the tendon>.

In order to diagnose the tendon, it is important to apply an induced magnetic field to the tendon in a state in which the induced magnetic field is parallel to the tendon. Further, it is very important to precisely measure a change in induced magnetic field, which is generated by damage to the tendon or a change in sectional force of the tendon and/or measure an induced voltage induced by the change in sectional force of the tendon. The application of the induced magnetic field and the measurement of the induced voltage needs to be easily performed on site. There is a need for a device that may meet this necessity.

The tendon extends and elongates in a longitudinal direction on site. Therefore, the device for diagnosing the tendon ("tendon diagnosis device") needs to be easily installed on the elongated tendon. Further, the tendon diagnosis device needs to be easily moved along the tendon in the longitudinal direction. A process of diagnosing the tendon needs to be performed while moving the tendon diagnosis device. It is also important to accurately recognize a distance that the tendon diagnosis device has moved along the tendon and recognize a current position of the tendon diagnosis device. It is important to eliminate or minimize an error, which is caused by a coil configured to generate an induced voltage, at the time of diagnosing the tendon. It is also very important to easily carry, mount, and store the tendon diagnosis device.

Bridges, such as cable-stayed and suspension bridges, are equipped with bridge cables. The bridge cable includes a plurality of tendons. The tendon diagnosis device may be used to diagnose a state of the bridge cable. The bridge cable is disposed inclinedly from one end of a bridge span to a pylon. The pylon of the bridge may reach a height of several tens of meters. Therefore, in order to diagnose the state of the bridge cable by using the tendon diagnosis device, the tendon diagnosis device needs to be moved along the bridge cable at a height of several tens of meters in the vicinity of the pylon. In this case, in order for an operator to manually move the tendon diagnosis device, the operator needs to work at a height of several tens of meters. Working at a high height is extremely dangerous.

DISCLOSURE

Technical Problem

An object of the present invention is to provide a technology and device capable of accurately diagnosing a state of a tendon.

Another object of the present invention is to provide a technology capable of applying an induced magnetic field in a form parallel to a tendon in a longitudinal direction. Still another object of the present invention is to provide a technology capable of precisely measuring a change in induced magnetic field, which is generated on a tendon and/or measure an induced voltage induced by the change in induced magnetic field.

Yet another object of the present invention is to provide a tendon diagnosis device capable of being easily installed on a tendon elongated in a longitudinal direction.

Still yet another object of the present invention is to provide a tendon diagnosis device capable of diagnosing a tendon while easily moving along the tendon.

A further object of the present invention is to provide a technology capable of easily installing a tendon diagnosis device on a bridge cable elongated in a longitudinal direction.

Another further object of the present invention is to provide a technology capable of diagnosing a bridge cable while easily moving a tendon diagnosis device along the bridge cable.

Technical Solution

The present invention provides a tendon diagnosis device including: a main body configured as a cylindrical member having a hollow portion and extending in a longitudinal direction; a search coil wound around the main body and configured to measure an induced voltage induced by a change in induced magnetic field: a plurality of magnetic field forming bodies each including a core member provided in the form of a bar extending in the longitudinal direction, and a solenoid coil wound around an outer surface of the core member, the plurality of magnetic field forming bodies being configured to form the induced magnetic field so that magnetic force lines flow; and end connection pieces respectively coupled to two opposite end surfaces of the main body based on the longitudinal direction and configured to be in close contact with two opposite ends of the core member of each of the magnetic field forming bodies 3 in order to allow the magnetic force lines of the induced magnetic field to concentratedly flow in the longitudinal direction along the tendon, in which the tendon diagnosis device is installed to surround an outer portion of a tendon so that the tendon is positioned in the hollow portion of the main body 1, and in which the search coil measures the induced voltage induced by a change in sectional force of the tendon or a change in induced magnetic field caused by damage to the tendon while moving along the tendon in a state in which the induced magnetic field is formed by applying a voltage to the solenoid coil in order to monitor a state of the tendon.

In addition, the present invention provides a bridge cable diagnosis method and a diagnosis system that diagnose a bridge cable by using the tendon diagnosis device. Specifically, the bridge cable diagnosis method and the diagnosis system according to the present invention includes: installing, at a position below an inclined bridge cable, a tendon diagnosis device, in which a solenoid coil and a search coil are positioned to be wound around an outer portion of a tendon and measure an induced voltage generated by applying a current to the coil to recognize a state of the tendon state, installing a traveling robot having a pulley at an upper side of the inclined bridge cable, coupling the other end of a hoisting wire to the tendon diagnosis device, extending one end of the hoisting wire toward the traveling robot, winding the hoisting wire around the pulley to change a direction of the hoisting wire, and coupling the other end of the hoisting wire to a winch to define a bridge cable diagnosis initial state: moving the traveling robot to an upper side of the bridge cable to a fixed position at a predetermined height; and adjusting tension of the hoisting wire by operating the winch, moving the tendon diagnosis device to a predetermined separate diagnosis position, operating the tendon diagnosis device at the separate diagnosis position, monitoring a state of the tendon, and diagnosing a state of the bridge cable.

Advantageous Effects

The tendon diagnosis device according to the present invention may be easily installed even on the elongated tendon. The tendon diagnosis device of the present invention may apply an induced magnetic field to the tendon while easily moving along the tendon. The tendon diagnosis device of the present invention may accurately and reliably measure a change in induced magnetic field and/or an induced voltage induced by the change in induced magnetic field. Therefore, it is possible to accurately and reliably determine whether the tendon is damaged by using data obtained by the tendon diagnosis device of the present invention. In addition, it is possible to measure a magnitude of a sectional force of the tendon by using data obtained by the tendon diagnosis device of the present invention. In addition, it is also possible to identify whether the sectional force of the tendon is changed and measure a degree to which the sectional force of the tendon is changed by using data obtained by the tendon diagnosis device of the present invention.

In order to use the present invention, theoretical values of the induced voltage of the tendon according to the damage type are recognized in advance for the specimen of the tendon. The induced voltage applied to the tendon is measured on site. Further, the measurement value of the induced voltage of the tendon and the theoretical value of the induced voltage are compared. Therefore, it is possible to quantitatively recognize how many wire rods are damaged among the wire rods, which constitute the tendon, at which locations on the tendon.

Therefore, it is possible to accurately detect whether the tendon is damaged and detect a damaged position by using the present invention. In addition, it is possible to quantitatively recognize a degree of damage to the tendon by using the present invention. It is possible to prepare in advance an appropriate solution capable of coping with damage to the tendon and damage to the structure caused by the damage to the tendon. Further, it is possible to more safely maintain and manage the structure using the tendon.

According to the diagnosis system according to the present invention, the tendon diagnosis device diagnoses the state of the bridge cable at the predetermined position while moving upward or downward. In this case, the upward or downward movement of the tendon diagnosis device is performed by adjusting the tension of the hoisting wire. The operation of the winch for pulling or releasing the hoisting wire is precisely and easily adjusted and controlled as necessary. Therefore, in the present invention, the tendon diagnosis device may be accurately moved to a separate diagnosis position at a desired movement speed. Further, it is possible to precisely control the movement of the tendon diagnosis device. Therefore, it is possible to improve efficiency and reliability in diagnosing the bridge cable by using the present invention.

The traveling robot, which is configured to be moved by being controlled by the operator in a wired/wireless manner or configured to move autonomously, may be moved to a high position in the vicinity of the pylon of the bridge. In the present invention, the traveling robot may move the tendon diagnosis device upward or downward. In this case, the operator need not work at a high position on the pylon, and the amount of work is minimized.

MODE FOR DISCLOSURE

Figure 1:
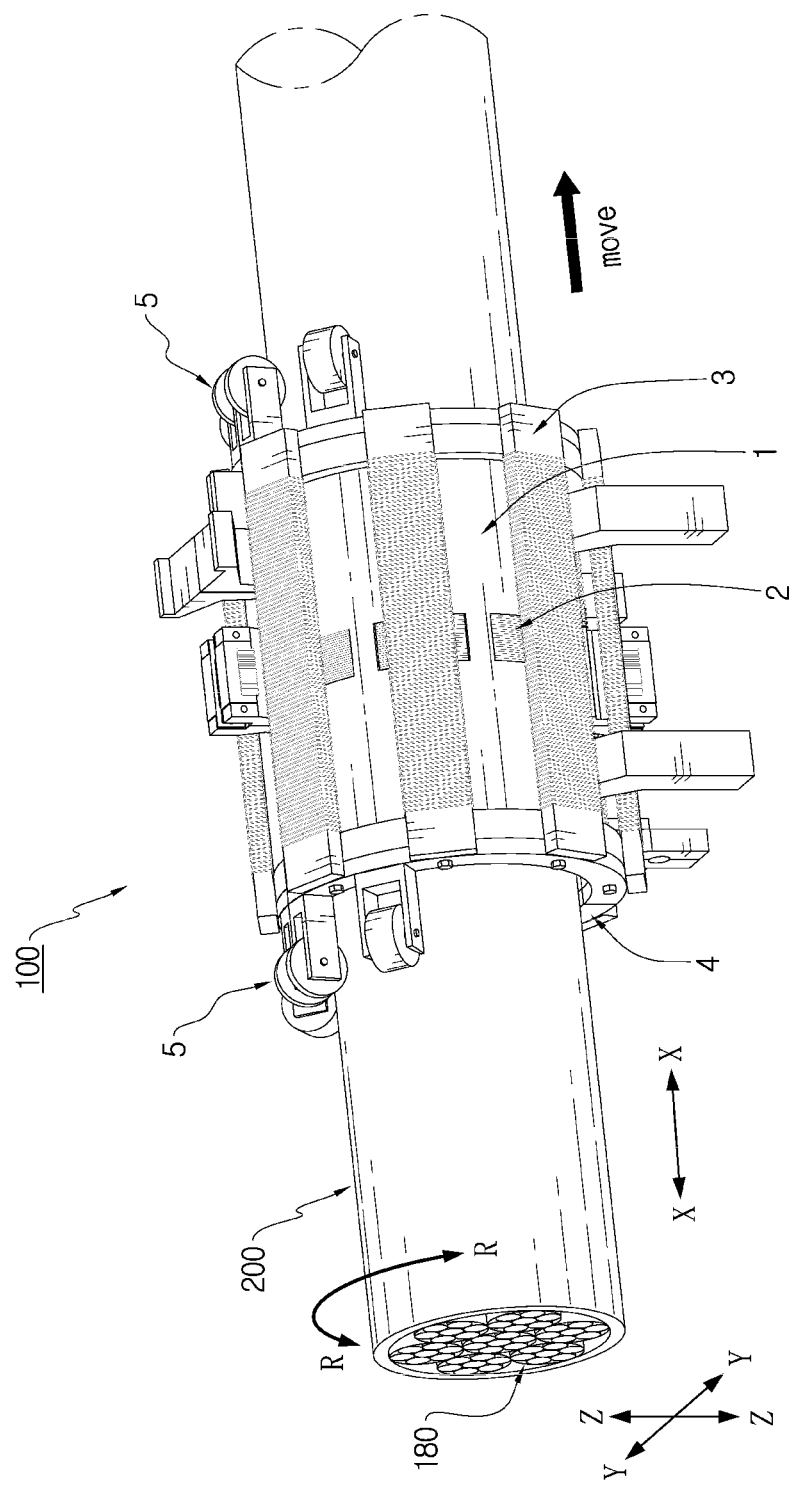
FIG. 1 is a schematic perspective view illustrating a state in which a tendon diagnosis device according to a first embodiment of the present invention is installed on a tendon.
Figure 2:
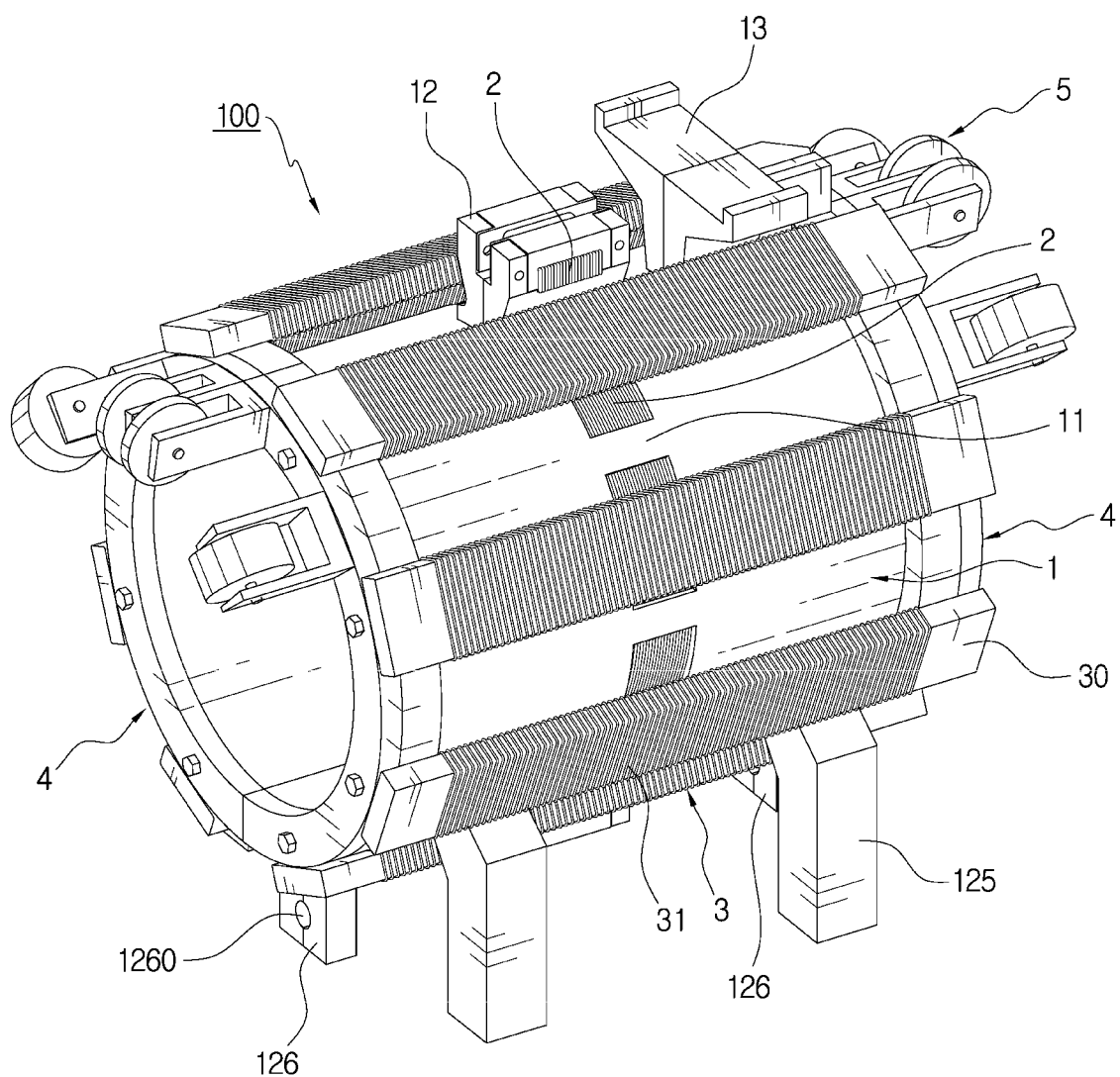
FIGS. 2 to 4 are schematic perspective views illustrating only the tendon diagnosis device illustrated in FIG. 1.
Figure 3:
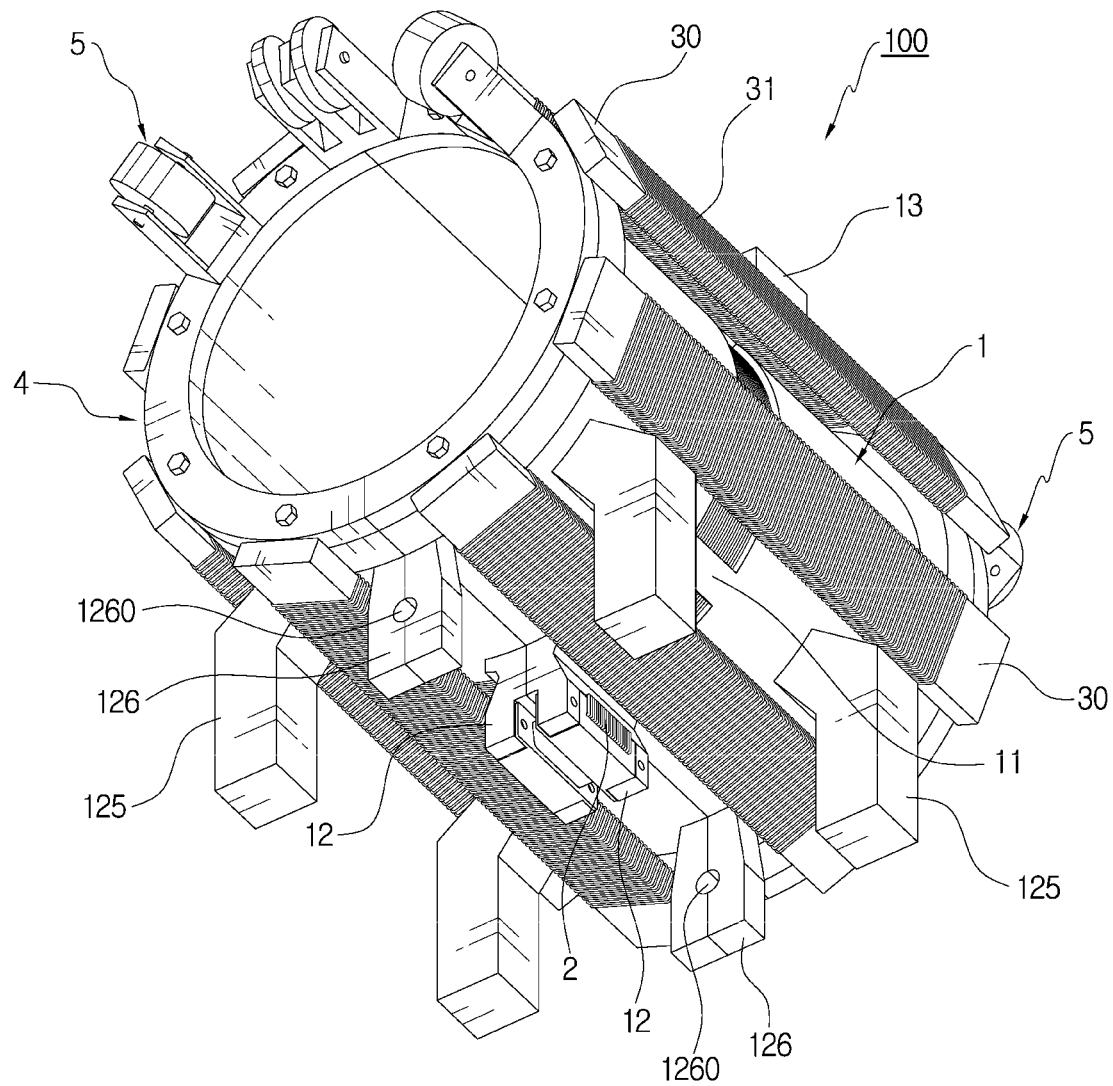
Figure 4:
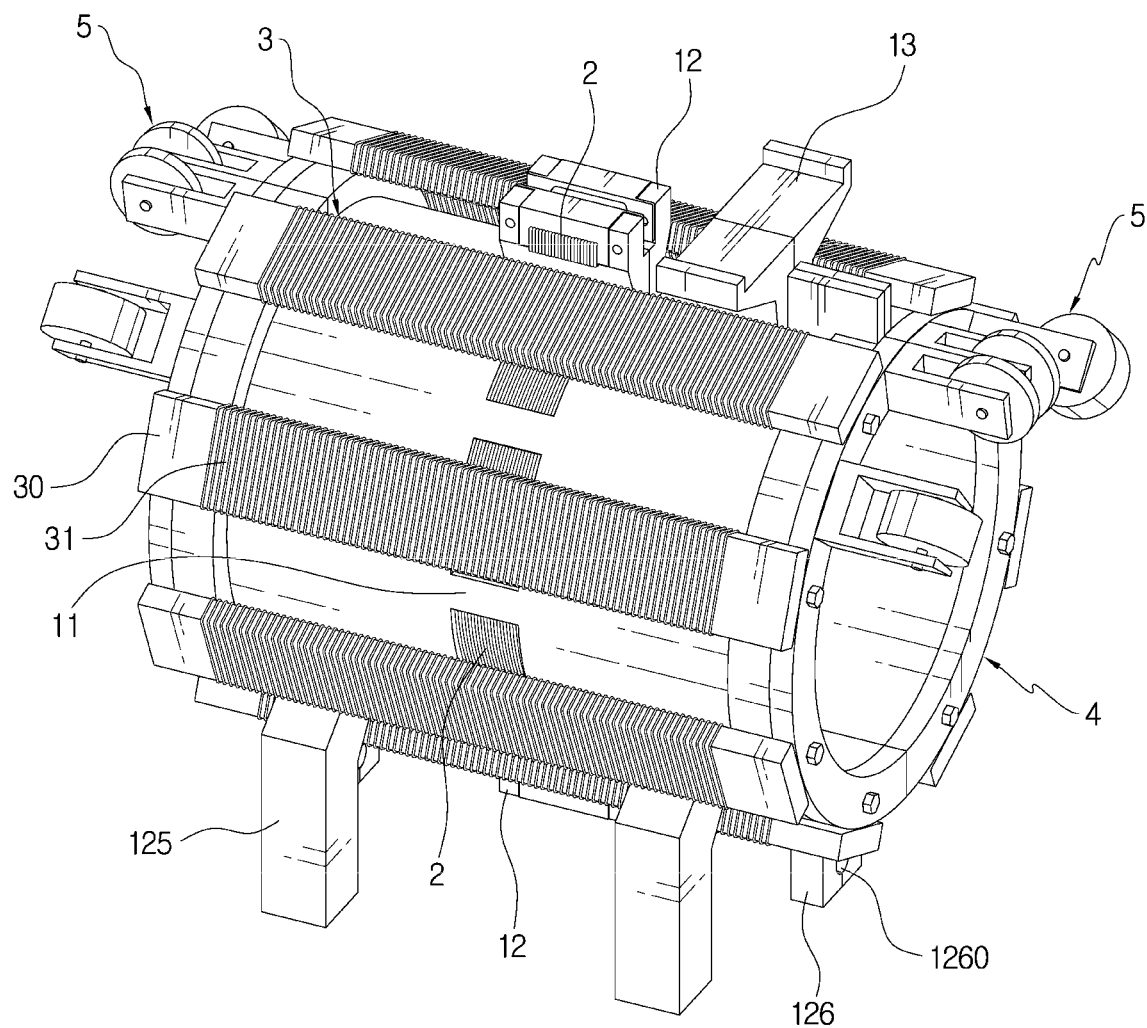
Figure 5:
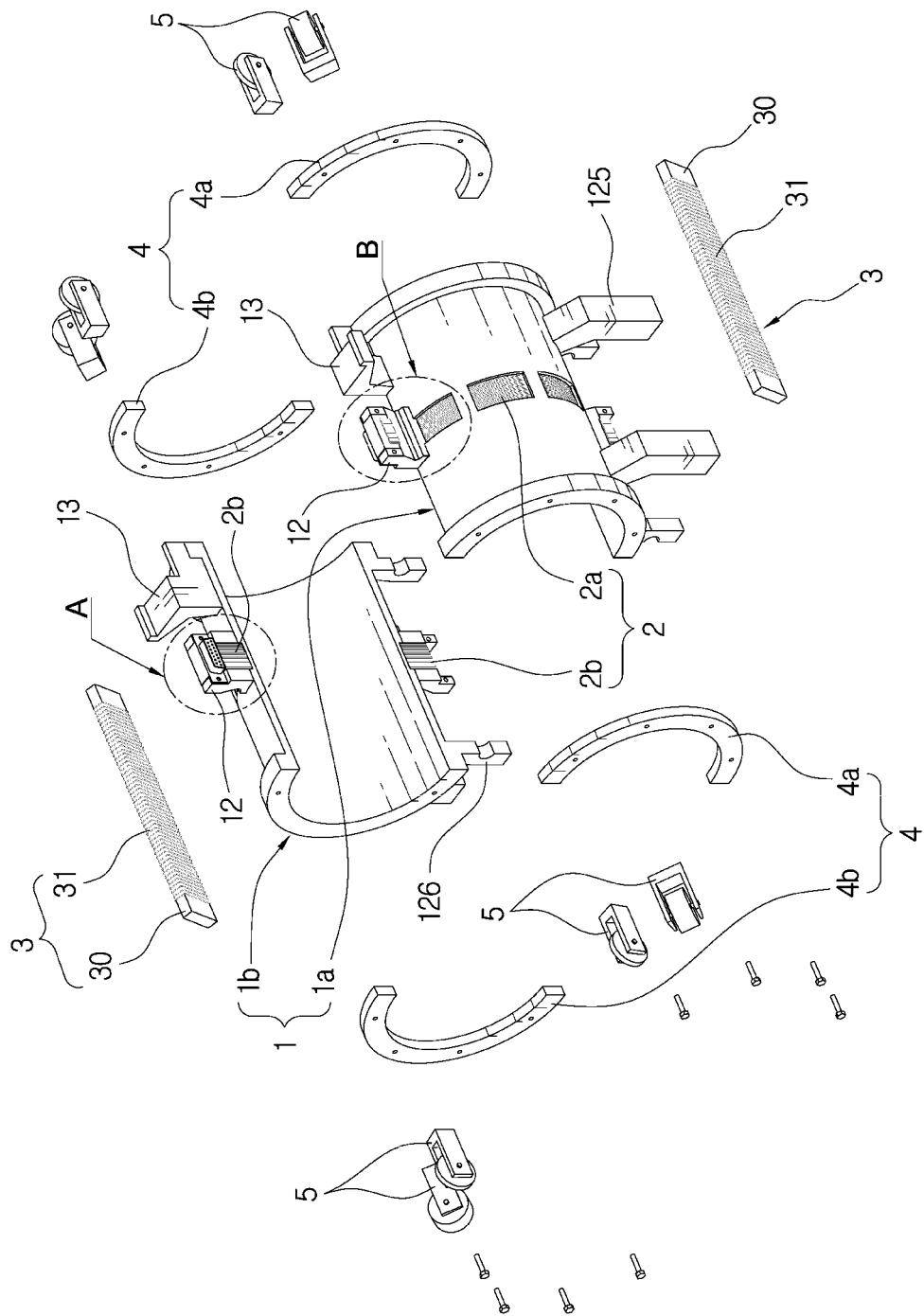
FIG. 5 is a schematic exploded perspective view of the tendon diagnosis device in FIGS. 1 to 4.

FIG. 1 is a schematic perspective view illustrating a state in which a tendon diagnosis device 100 according to a first embodiment of the present invention is installed on a bridge cable 200 including tendons 180. FIGS. 2 to 4 are schematic assembled perspective views illustrating the tendon diagnosis device 100 illustrated in FIG. 1. FIG. 5 is a schematic exploded perspective view of the tendon diagnosis device 100 illustrated in FIGS. 2 to 4. In the present specification, a "longitudinal direction" means a direction in which the bridge cable 200 is elongated. A "transverse direction" means a direction orthogonal to the longitudinal direction. A "vertical direction" means a direction orthogonal to the transverse direction. A "circumferential direction" means a direction defined along a circumference of a cylindrical main body 1. In FIG. 1, the arrow X-X indicates the longitudinal direction, the arrow Y-Y indicates the transverse direction, the arrow Z-Z indicates the vertical direction, and the arrow R-R indicates the circumferential direction.

The tendon diagnosis device 100 has a pipe shape having a hollow portion. The tendon diagnosis device 100 installed to surround an outer portion of the tendon or the bridge cable 200. The tendon diagnosis device 100 includes the main body 1, a search coil 2, a plurality of magnetic field forming bodies 3, and end connection pieces 4. The tendon diagnosis device 100 may further include guide wheels 5.

The main body 1 is configured by a hollow cylindrical member extending in the longitudinal direction. Therefore, when the tendon diagnosis device 100 is installed on the tendon or the bridge cable 200, the tendon or the bridge cable 200 penetrates the hollow portion of the main body 1. The tendon or the bridge cable 200 extends in the longitudinal direction while having a significant length. The tendon diagnosis device 100 has a structure divided into two members in the transverse direction so that the tendon diagnosis device 100 may be conveniently installed on the tendon. The main body 1 includes two members each having a half pipe shape. The cylindrical main body 1 is configured by assembling the two members each having a half pipe shape. For convenience, the two members, which are separated and each have a half pipe shape, are respectively referred to as a "first half main body 1a" and a "second half main body 1b".

The search coil 2 is wound around the main body 1. The search coil 2 serves to measure an induced voltage induced by a change in induced magnetic field. The induced magnetic field changes when the tendon is damaged or a sectional force of the tendon changes in a state in which the induced magnetic field is applied to the tendon. The induced voltage is generated when the induced magnetic field changes. The search coil 2 serves to measure the induced voltage. The search coil 2 includes a first half search coil 2a and a second half search coil 2b. The first half search coil 2a is installed to be in close contact with an outer surface of the first half main body 1a. The second half search coil 2b is installed to be in close contact with an outer surface of the second half main body 1b. The first half main body 1a and the second half main body 1b are coupled, such that a cylindrical member is defined. Further, when the first half main body 1a and the second half main body 1b are coupled, an end of the first half search coil 2a and an end of the second half search coil 2b are bound to each other. Therefore, the first half search coil 2a and the second half search coil 2b are electrically connected to each other. The first half search coil 2a and the second half search coil 2b are electrically connected to each other, such that the search coil 2 is implemented. The end of the first half search coil 2a and the end of the second half search coil 2b are electrically bound to each other, such that a state in which an electric wire is spirally and continuously wound around the outer surface of the cylindrical main body 1 is implemented. The electric wire, which is spirally wound around the outer surface of the main body 1 as described above, corresponds to the search coil 2.

Figure 6:
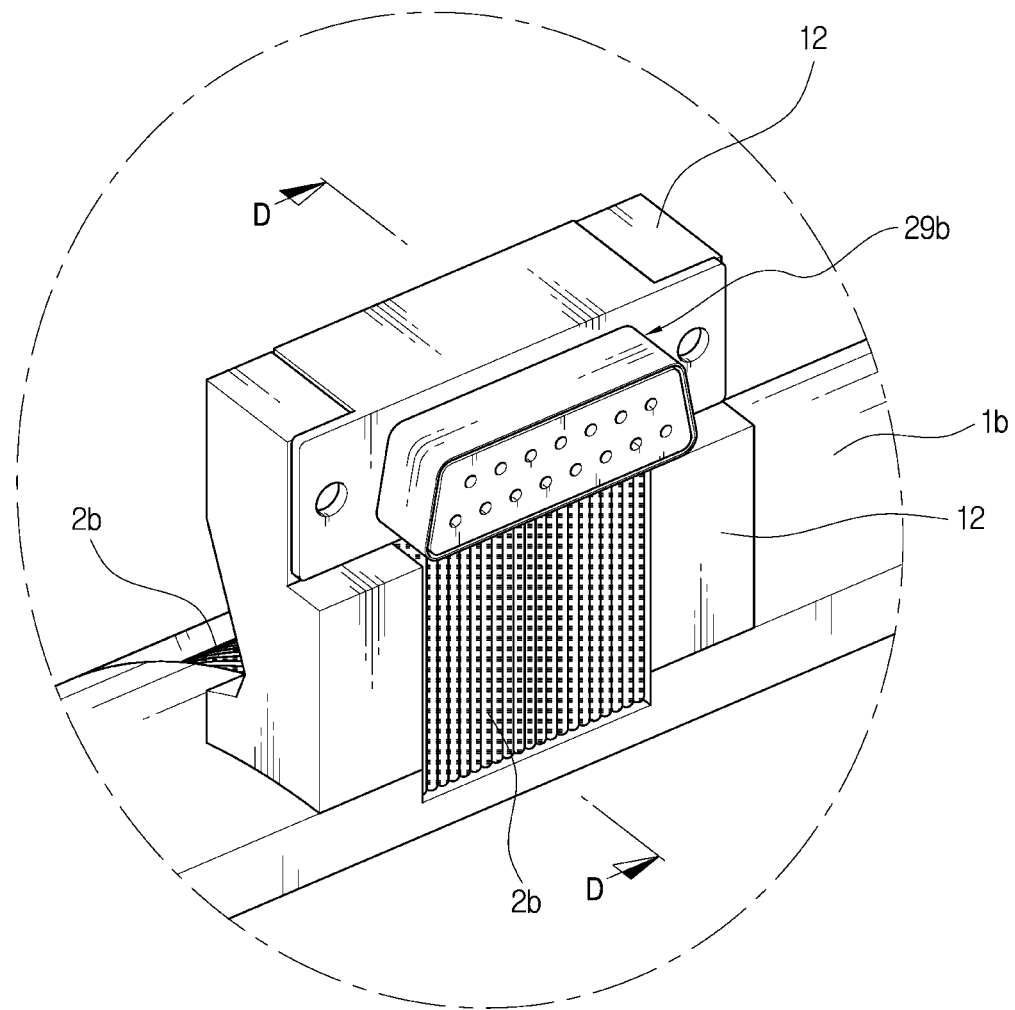
FIG. 6 is a schematic partially enlarged perspective view of circular part A in FIG. 5.
Figure 7:
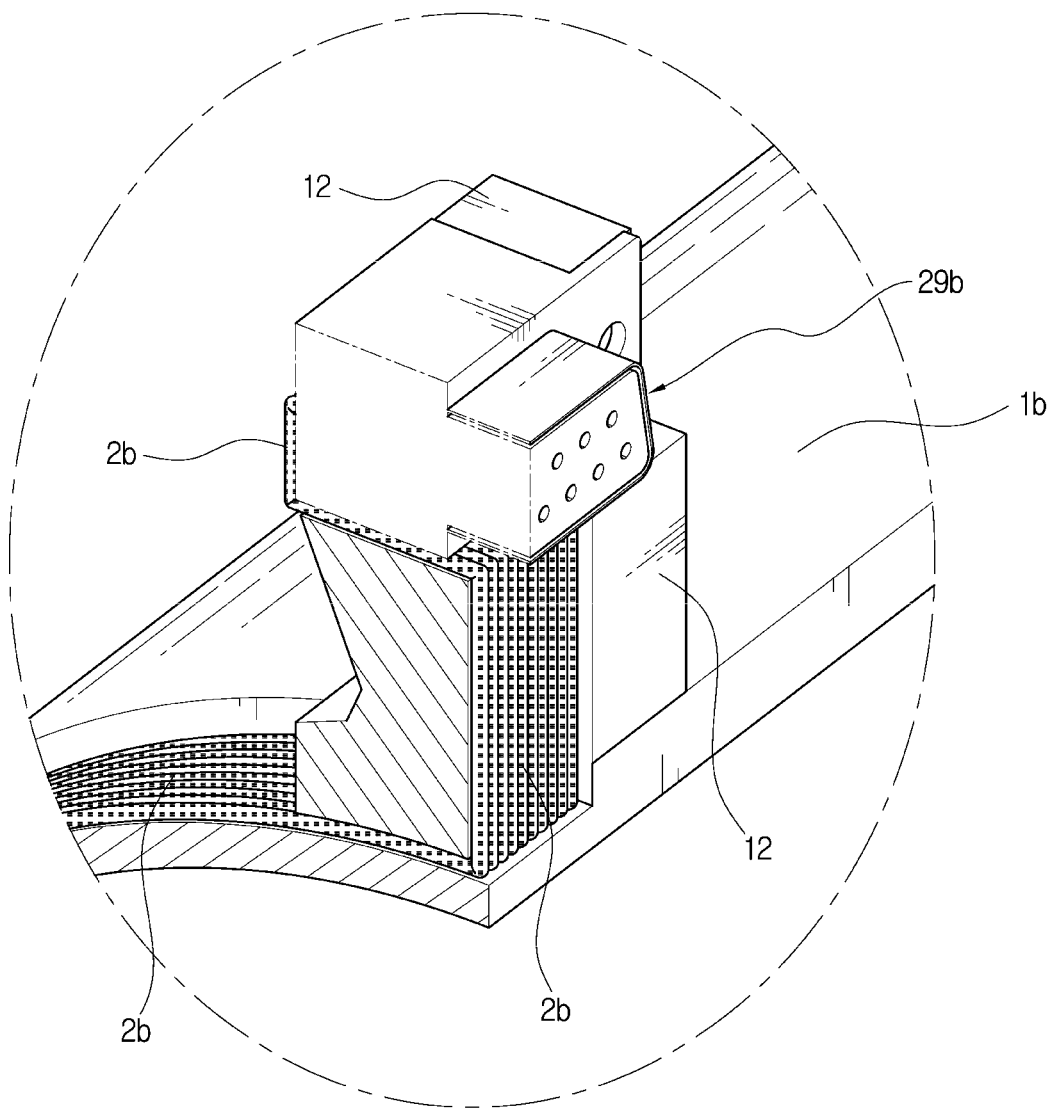
FIG. 7 is a schematic partially longitudinal cross-sectional perspective view taken along line D-D in FIG. 6.
Figure 8:
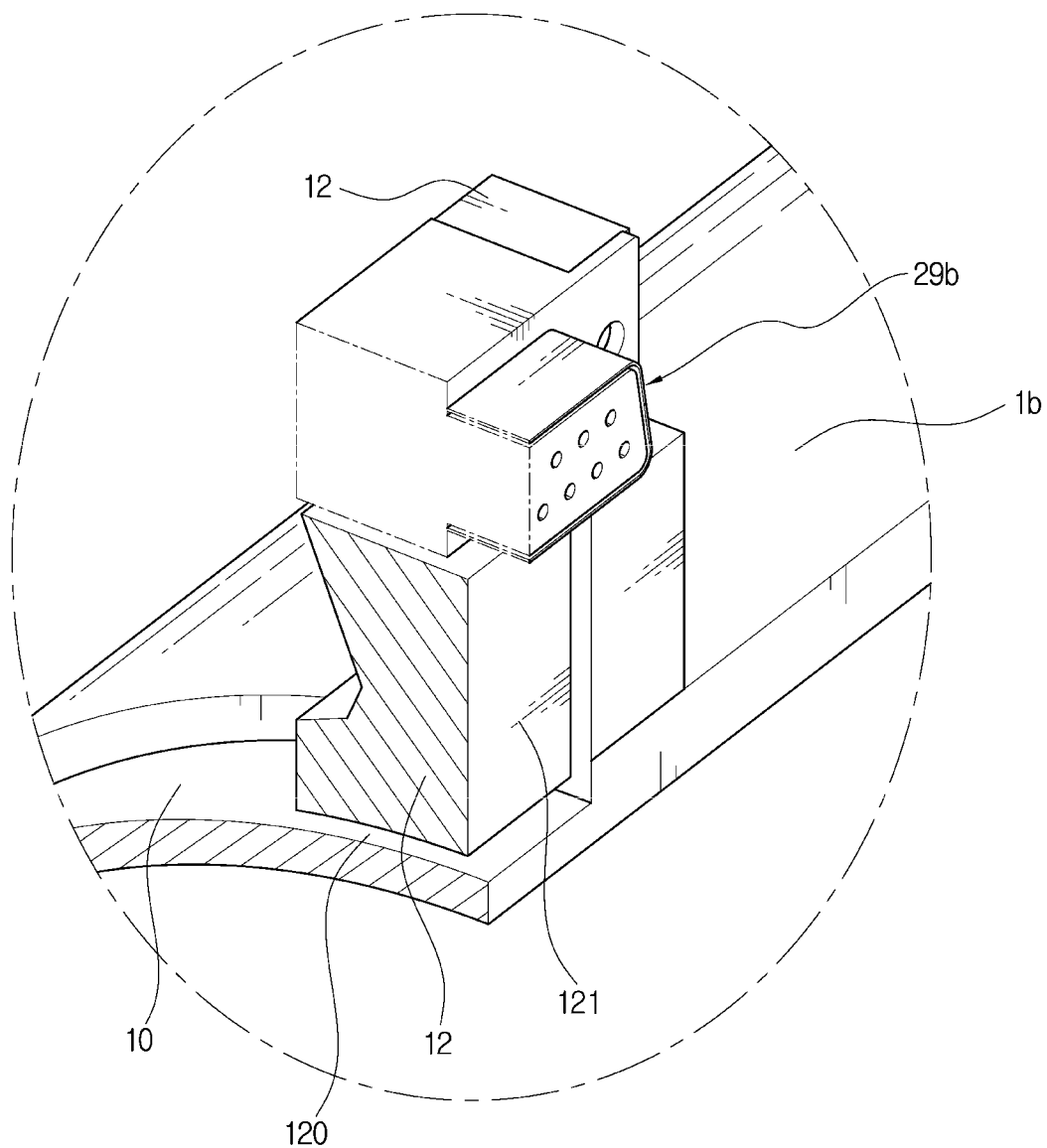
FIG. 8 is a schematic partially cross-sectional perspective view corresponding to FIG. 7 and illustrating a state in which a first half search coil is excluded from FIG. 7.
Figure 9:
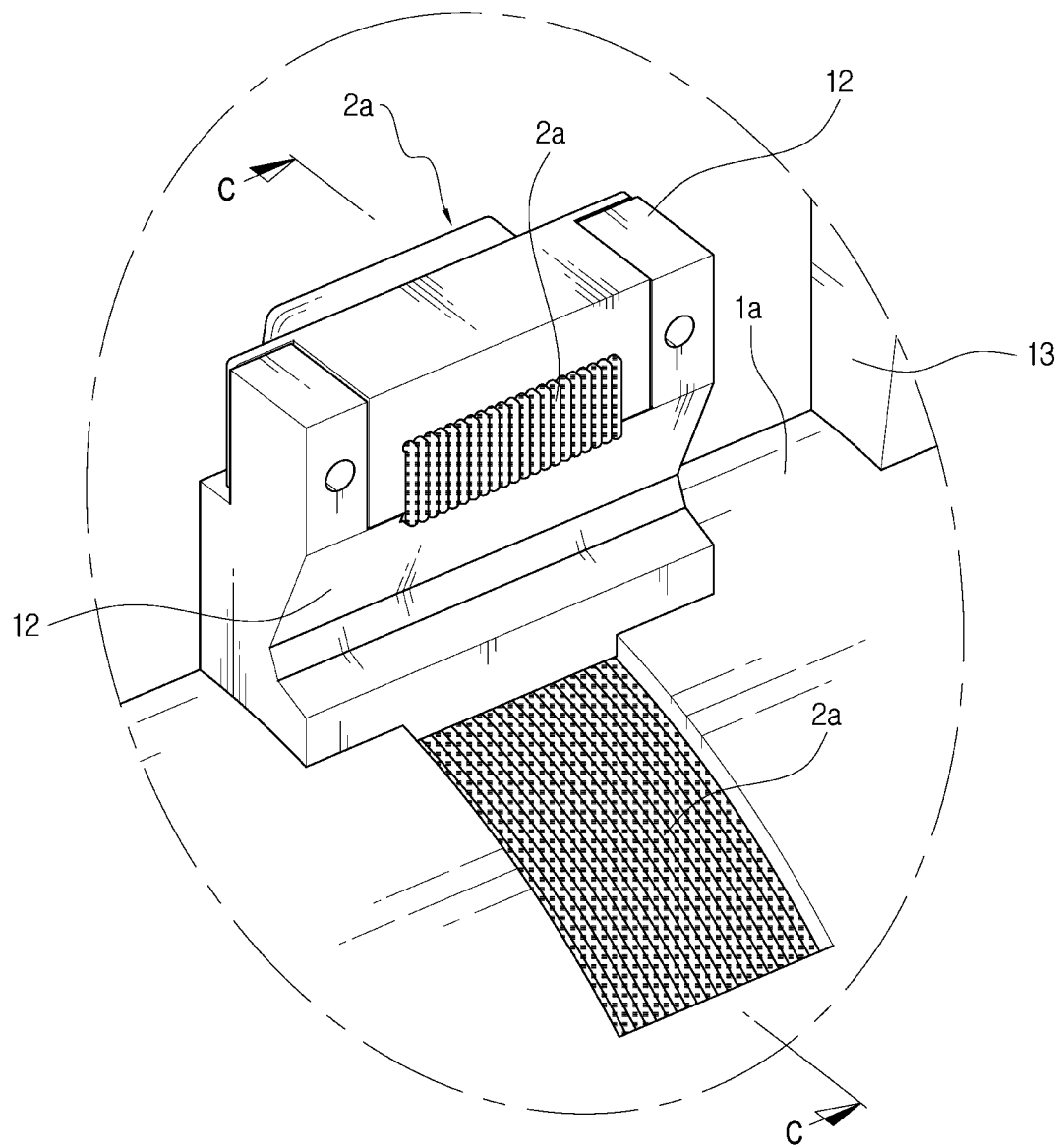
FIG. 9 is a schematic partially enlarged perspective view illustrating only circular part B in FIG. 5.
Figure 10:
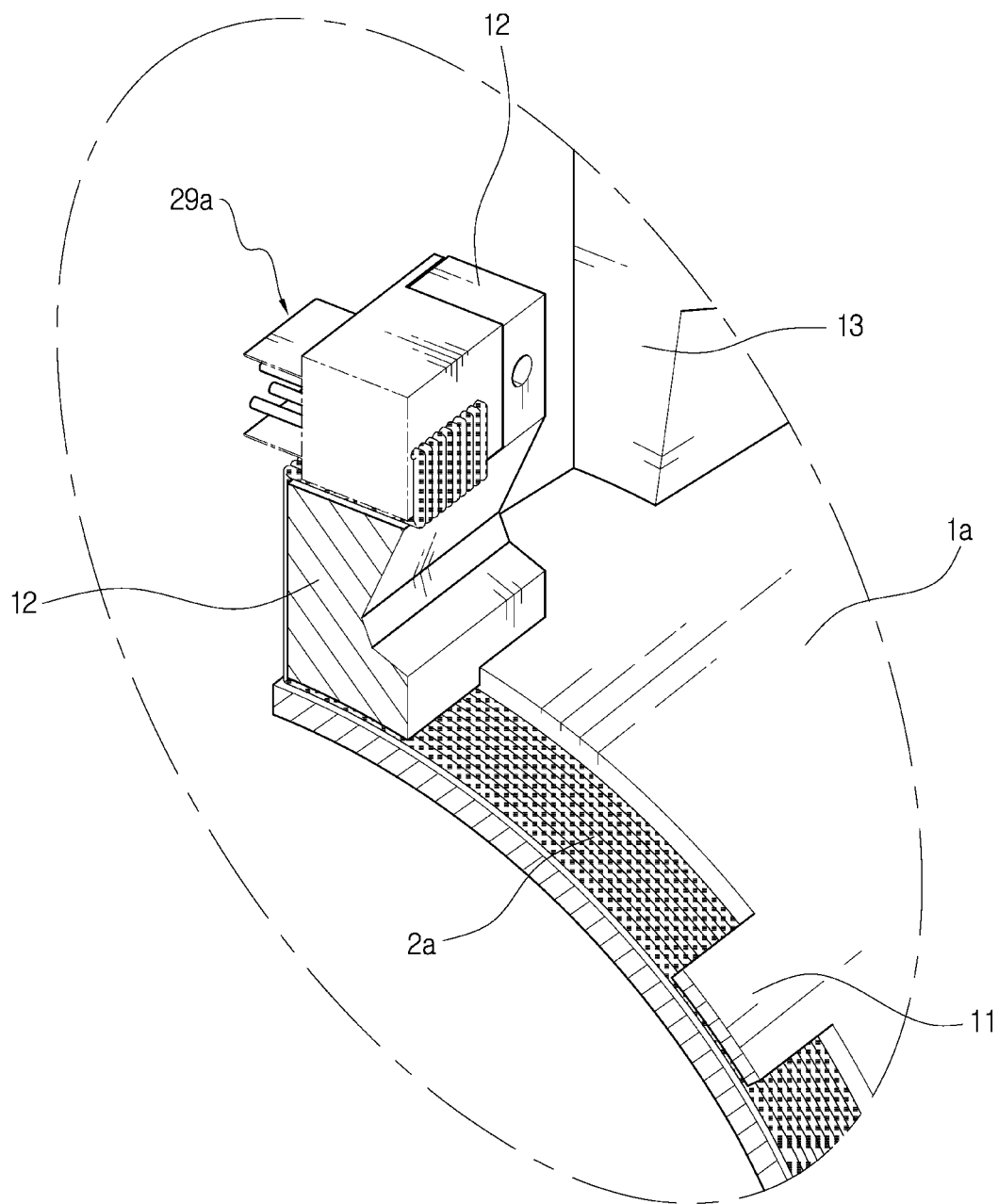
FIG. 10 is a schematic partially longitudinal cross-sectional perspective view taken along line C-C in FIG. 9.
Figure 11:
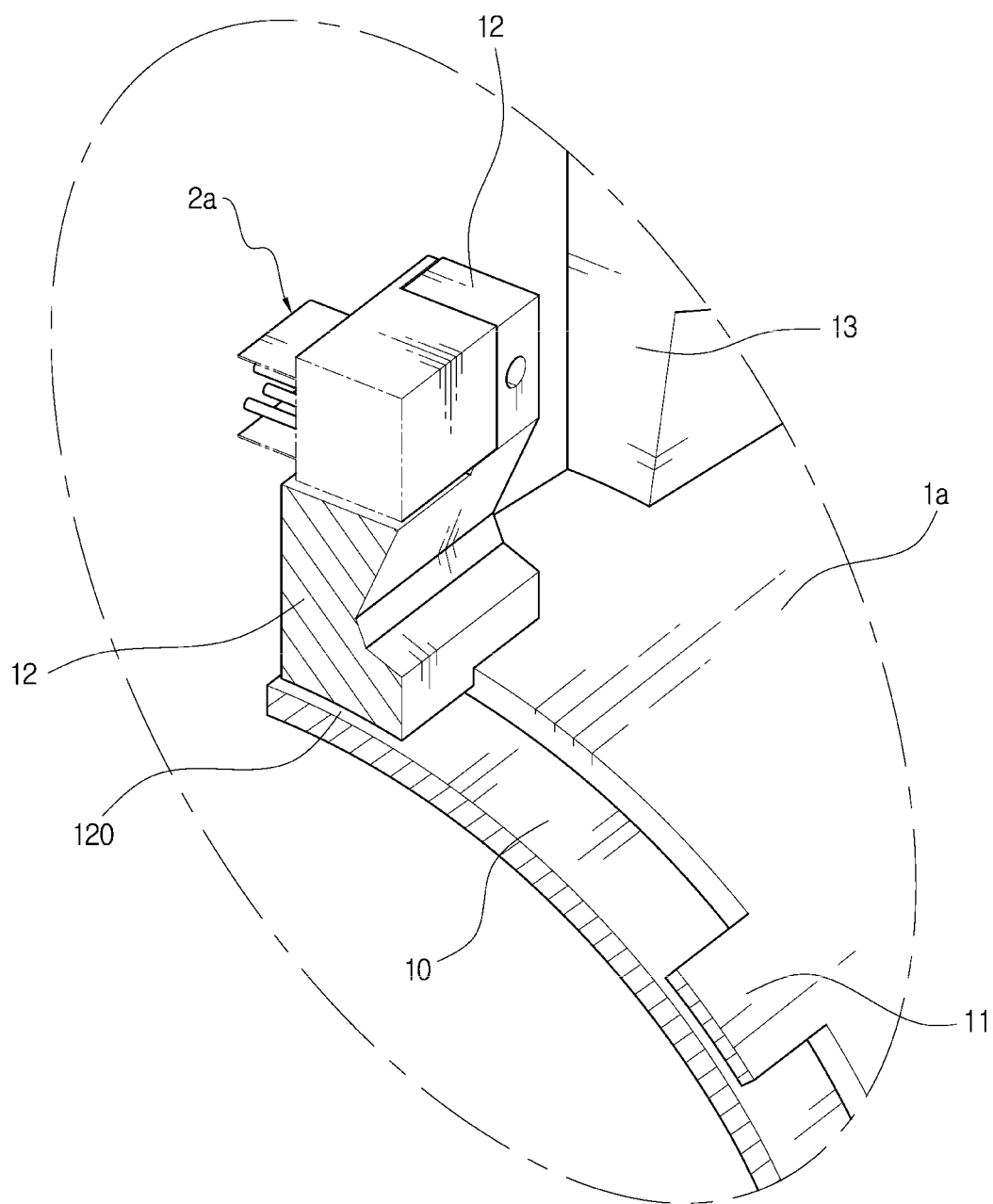
FIG. 11 is a schematic partially cross-sectional perspective view corresponding to FIG. 10 and illustrating a state in which a second half search coil is excluded from FIG. 10.

FIG. 6 is a schematic partially enlarged perspective view illustrating only circular part A in FIG. 5. FIG. 7 is a schematic partially longitudinal cross-sectional perspective view taken along line D-D in FIG. 6. FIG. 8 is a schematic partially cross-sectional perspective view corresponding to FIG. 7. FIG. 8 does not illustrate the second half search coil 2b. FIG. 9 is a schematic partially enlarged perspective view illustrating only circular part B in FIG. 5. FIG. 10 is a schematic partially longitudinal cross-sectional perspective view taken along line C-C in FIG. 9. FIG. 11 is a schematic partially cross-sectional perspective view corresponding to FIG. 10. FIG. 11 does not illustrate the first half search coil 2a.

How to install the second half search coil 2b on the second half main body 1b will be described with reference to FIGS. 6 to 8. The second half search coil 2b installed to be in close contact with the outer surface of the second half main body 1b while surrounding the outer surface of the second half main body 1b in the circumferential direction. The second half search coil 2b includes a plurality of electric wires disposed side by side in the longitudinal direction. The plurality of electric wires disposed in the longitudinal direction is in close contact with one another to define a planar member (plate member) shape. An electric connector 29b is provided at an end of the second half search coil 2b. In the drawings, a pin connector is illustrated as the electric connector 29b. However, the present invention is not limited thereto. In the embodiment illustrated in the drawings, a concave portion 10 is formed in the outer surface of the second half main body 1b. The concave portion 10 extends along a circumference of the second half main body 1b. The second half search coil 2b is positioned in the concave portion 10. Therefore, the second half search coil 2b cannot move in the longitudinal direction on the outer surface of the second half main body 1b. In the embodiment illustrated in the drawings, a bridging portion 11 is formed to traverse the concave portion 10 in the longitudinal direction. When the second half search coil 2b is disposed in the concave portion 10, the second half search coil 2b is positioned below the bridging portion 11. The bridging portion 11 prevents the second half search coil 2b from separating from the outer surface of the second half main body 1b. Therefore, the second half search coil 2b is consistently kept in close contact with the outer surface of the second half main body 1b. The bridging portion 11 may be provided as a plurality of bridging portions 11 provided along the concave portion 10 in the circumferential direction.

The configuration of the first half main body 1a is illustrated in detail in FIGS. 9 to 11. A configuration in which the first half search coil 2a is installed on the first half main body 1a is illustrated in detail in FIGS. 9 to 11. The above-mentioned description of the second half main body 1b and the second half search coil 2b is also applied to the first half main body 1a and the first half search coil 2a in the same way.

Vertical protruding portions 12 are respectively provided on the first and second half main bodies 1a and 1b illustrated in the drawings and extend and protrude in the vertical direction. The vertical protruding portions 12 are provided at positions at which the first and second half search coils 2a and 2b are installed. Lower ends of the vertical protruding portions 12 are connected to edges of the first and second half main bodies 1a and 1b. Electric wire passing holes 120 are formed in portions where the vertical protruding portions 12 are connected to the first and second half main bodies 1a and 1b. The electric wire passing hole is formed through the vertical protruding portion 12 in the circumferential direction. The electric wire passing hole 120 and the concave portion 10 are continuously formed. Therefore, the first and second half search coils 2a and 2b pass through the electric wire passing holes 120. Further, the first and second half search coils 2a and 2b extend in the vertical direction while being in close contact with inner surfaces of the vertical protruding portions 12 (surfaces of the vertical protruding portions facing each other). Therefore, the first and second half search coils 2a and 2b are positioned while standing in the vertical direction along the inner surfaces of the vertical protruding portions 12.

The first and second half main bodies 1a and 1b are assembled while adjoining each other in the transverse direction, thereby defining a cylindrical shape. In this case, the inner surfaces of the vertical protruding portions 12 adjoin each other while facing each other. As described above, the first and second half search coils 2a and 2b are in close contact with the inner surfaces of the vertical protruding portions 12 while standing uprightly. Therefore, when the vertical protruding portions 12 are in close contact with each other while adjoining each other, the ends of the first and second half search coils 2a and 2b positioned on the inner surfaces of the vertical protruding portions 12 are in close contact with each other while facing each other and maintaining the vertical state or are positioned to be very adjacent to each other. The ends of the first and second half search coils 2a and 2b, which are disposed as described above, extend upward and downward by sufficient lengths in the vertical direction and then are electrically connected to each other. As the ends of the first and second half search coils 2a and 2b are electrically connected to each other, the search coil 2 is implemented as if the electric wire is continuously and spirally wound around the main body 1.

As illustrated in FIGS. 7 and 8, when concave vertical recess portions 121 extending in the vertical direction are present in the inner surfaces of the vertical protruding portions 12, the ends of the first and second half search coils 2a and 2b are positioned in the vertical recess portions 121. In this case, the first and second half search coils 2a and 2b do not protrude from the vertical protruding portions 12. Therefore, when the vertical protruding portions 12 of the first and second half main bodies 1a and 1b adjoin each other while facing each other, the inner surfaces of the vertical protruding portions 12, which face each other, may be appropriately in close contact with each other regardless of thicknesses of the first and second half search coils 2a and 2b.

The electric connectors 29a and 29b are respectively provided at the ends of the first and second half search coils 2a and 2b. The electric connectors 29a and 29b are coupled to and installed on the vertical protruding portions 12. The main body 1 is implemented as the first and second half main bodies 1a and 1b are assembled and coupled to each other while surrounding the tendon 200 at two opposite sides of the tendon 200 based on the transverse direction. When the first and second half main bodies 1a and 1b are assembled and coupled, the electric connectors 29a and 29b are automatically fastened to each other. When the electric connectors 29a and 29b are fastened to each other, the first and second half search coils 2a and 2b are electrically connected to each other.

One of the advantages of the present invention, which may be expected by the installation structure of the first and second half search coils 2a and 2b, is that the first and second half search coils 2a and 2b may be easily replaced. Another advantage is that it is possible to minimize a degree to which the induced magnetic field formed outside the main body affects the first and second half search coil 2a and 2b. These advantages will be described more specifically.

The induced magnetic field is formed by the magnetic field forming bodies 3 each extending in the longitudinal direction in the form of a rod. In this case, the applied induced magnetic field is formed such that the magnetic force lines flow in the longitudinal direction not only inside the hollow portion of the main body 1 but also outside the main body 1. Therefore, the first and second half search coils 2a and 2b are also affected by the magnetic force lines flowing in the longitudinal direction outside the main body 1.

An induced voltage, which is intended to be measured by the first and second half search coils 2a and 2b, is generated by a change in induced magnetic field formed inside the hollow portion of the main body 1. Therefore, the induced magnetic field ("the induced magnetic field outside the main body"), which is formed such that the magnetic force lines flow in the longitudinal direction outside the main body 1, and the change in induced magnetic field cause noise that causes an error of a measurement value to the first and second half search coils 2a and 2b. Therefore, in order to reduce a measurement error of the search coil 2 and improve accuracy and reliability, it is necessary to minimize a degree to which the induced magnetic field outside the main body affects the first and second half search coils 2a and 2b. To this end, it is necessary to minimize a factor that hinders the magnetic force lines from flowing in the longitudinal direction outside the main body 1.

In order to implement the search coil 2, the first and second half search coils 2a and 2b need to be electrically connected to each other outside the main body 1. The electric connectors 29a and 29b are used to connect the electric wires. In case that the electric connectors 29a and 29b are present at positions close to the outer surface of the main body 1, the electric connectors 29a and 29b hinder the magnetic force lines from flowing in the longitudinal direction outside the main body 1, which causes noise. This noise may cause a large measurement error to the first and second half search coils 2a and 2b.

The magnetic flux density of the induced magnetic field outside the main body increases as the distance from the main body 1 decreases. As the electric connectors 29a and 29b become close to the outer surface of the main body 1, a measurement error of the search coil 2 caused by the electric connector increases, and the number of times an error occurs further increases. In order to prevent the error, the electric connectors 29a and 29b need to be positioned to be distant from the outer surface of the main body 1.

The first and second half search coils 2a and 2b each have a planar member shape. If the planar member shapes of the first and second half search coils 2a and 2b are orthogonal to each other in the longitudinal direction or positioned at an angle when the ends of the first and second half search coils 2a and 2b extend or are connected to each other by means of the electric connectors 29a and 29b, this situation may have a very large adverse effect on the longitudinal flow of the magnetic force lines outside the main body 1. This situation eventually causes a large measurement error. When the lengths of the first and second half search coils 2a and 2b extending to the outside of the main body 1 are increased so that the electric connectors 29a and 29b are positioned to be distant from the outer surface of the main body 1, the likelihood that the planar member shapes of the first and second half search coils 2a and 2b are orthogonal to each other in the longitudinal direction or positioned at an angle is further increased. In this case, the likelihood of the occurrence of measurement error of the first and second half search coils 2a and 2b and a degree of the measurement error are also increased.

However, the present invention solves all the above-mentioned problems. As described above, in the present invention, the vertical protruding portions 12 are installed on the first and second half main bodies 1a and 1b, and the electric wire passing holes 120 are formed at the lower ends of the vertical protruding portions 12. Therefore, even though the first and second half search coils 2a and 2b are wound around the outer surfaces of the first and second half main bodies 1a and 1b, the ends of the first and second half search coils 2a and 2b pass through the electric wire passing holes 120 and are positioned on the inner surfaces of the vertical protruding portions 12. Therefore, when the vertical protruding portions 12 adjoin each other while facing each other to assemble the first and second half main bodies 1a and 1b, the ends of the first and second half search coils 2a and 2b also extend while standing in the vertical direction and facing each other. That is, in the present invention, the planar member shapes of the first and second half search coils 2a and 2b configured by the plurality of electric wires are positioned to extend in the longitudinal direction, and this state is consistently maintained. If the planar shapes of the first and second half search coils 2a and 2b are orthogonal to each other in the longitudinal direction or disposed at an angle, this situation hinders the magnetic force lines from flowing in the longitudinal direction outside the main body 1. The present invention may prevent this hindrance. Furthermore, in the present invention, the ends of the first and second half search coils 2a and 2b are positioned in the vertical recess portions 121 concavely formed in the inner surfaces of the vertical protruding portions 12, such that the inner surfaces of the vertical protruding portions 12, which face each other, are appropriately in close contact with each other. Therefore, it is also possible to minimize a degree to which the thicknesses of the electric wires of the first and second half search coils 2a and 2b affect the flow of the magnetic force lines outside the main body 1. In the present invention, even though the lengths of the first and second half search coils 2a and 2b extending to the outside of the main body 1 are increased, the disturbance of the induced magnetic field outside the main body caused by the increase in thickness is minimized, and the adverse effect caused by the disturbance is minimized.

The first and second half search coils 2a and 2b may extend sufficiently long to the outside of the main body 1, such that the electric connectors 29a and 29b, which electrically connects the first and second half search coils 2a and 2b, may be positioned at the positions distant from the outer surface of the main body 1. As the electric connectors 29a and 29b become distant from the outer surface of the main body 1, the magnetic flux density of the induced magnetic field may decrease, and a measurement error of the first and second half search coils 2a and 2b caused by the induced magnetic field outside the main body may decrease. The first and second half search coils 2a and 2b extend sufficiently long to the outside of the main body 1 so that the electric connectors 29a and 29b are positioned at the positions distant from the outer surface of the main body 1. In the present invention, because the first and second half search coils 2a and 2b extend long to the outside of the main body 1, a case in which the planar member shapes of the first and second half search coils 2a and 2b are orthogonal to each other in the longitudinal direction or positioned at an angle is basically prevented. That is, in the present invention, even though the lengths of the first and second half search coils 2a and 2b are increased, the planar member shapes of the first and second half search coils 2a and 2b configured by the plurality of electric wires are positioned to extend in the longitudinal direction. Therefore, it is possible to suppress a disturbance of the magnetic force lines outside the main body 1. Therefore, the accuracy and reliability of the measurement value of the induced voltage obtained by the search coil 2 including the first and second half search coils 2a and 2b are high.

In the present invention, the electric connectors 29a and 29b are used to electrically connect the first and second half search coils 2a and 2b. Further, because the electric connectors 29a and 29b are installed on the vertical protruding portions 12, the electric connectors 29a and 29b are always present at predetermined positions. Therefore, it is possible to prevent any inconvenience or discomfort occurring when the outer surfaces of the electric connectors 29a and 29b are exposed at the time of handling or using the tendon diagnosis device 100. In particular, the positions of the electric connectors 29a and 29b are constantly maintained without changing during the process of diagnosing the tendon, which may basically prevent the occurrence of measurement error caused by a change in positions of the electric connectors 29a and 29b.

The tendon diagnosis device 100 may have distance meter mounting portions 13 disposed adjacent to the vertical protruding portions 12 at intervals from the vertical protruding portions 12 in the longitudinal direction (see FIGS. 1 to 4). The distance meter mounting portions 13 are provided to protrude outward from the outer surfaces of the first and second half main bodies 1a and 1b. The distance meter mounting portion 13 has a flat upper surface. When the first and second half main bodies 1a and 1b are assembled and coupled to each other, the flat upper surfaces of the distance meter mounting portions 13 are connected to each other, thereby ensuring a sufficient mounting area in which a distance meter for measuring a distance may be placed. Therefore, a distance meter, such as a laser distance meter, capable of measuring a distance may be stably installed on the distance meter mounting portions 13. In the state in which the tendon diagnosis device 100 is installed on the outer portion of the tendon or the bridge cable 200, the tendon diagnosis device 100 moves in the longitudinal direction and diagnoses a state of the tendon or the bridge cable 200 at predetermined measurement points. In this case, the tendon diagnosis device 100 may move in the state in which the distance meter is installed on the distance meter mounting portions 13. Therefore, it is possible to accurately recognize a movement distance and a current position of the tendon diagnosis device 100, which may perform precise the diagnosis at the position of the accurate predetermined measurement point.

Supports 125 are provided in the form of a plurality of legs and disposed on the outer surfaces of the first and second half main bodies 1a and 1b. As illustrated in detail in FIG. 3, the supports 125, which are provided in the form of a plurality of legs extending vertically downward, may protrude from the first and second half main bodies 1a and 1b. Because the tendon diagnosis device 100 has a cylindrical shape as a whole, there is concern that the tendon diagnosis device 100 rolls in the transverse direction. However, in case that the supports 125 are provided and lower ends of the supports 125 are placed on a floor, the tendon diagnosis device 100 is very stably positioned without rolling. Therefore, the convenience is significantly improved at the time of carrying or mounting and storing the tendon diagnosis device 100 of the present invention.

Jack installation plates 126 may be further provided on the outer surfaces of the first and second half main bodies 1a and 1b to install a data logger jack. As illustrated in detail in FIG. 3, the jack installation plates 126, which each have a plate shape extending vertically downward, may protrude from the first and second half main bodies 1a and 1b. The jack installation plates 126 may be positioned between the supports 125. As illustrated in the drawings, the jack installation plates 126 may be provided as a plurality of jack installation plates 126 provided at intervals at the front and rear sides based on the longitudinal direction. The data logger jack for transmitting data is configured as a cylindrical rod member. The jack installation plate 126 has a through-hole 1260 into which the data logger jack may be penetratively inserted. Therefore, the data logger jack may be properly installed by using the jack installation plate 126. For reference, the data logger jack fitted into the through-holes 1260 is not illustrated in the drawings.

The magnetic field forming body 3 has a core member 30 made of a metallic material and provided in the form of a rod member extending in the longitudinal direction. A solenoid coil 31 is spirally wound around the outer surface of the core member 30. The core member 30 extends in the longitudinal direction and provided at a position at which the magnetic field forming body 3 is spaced apart from the outer surface of the main body 1. The plurality of magnetic field forming bodies 3 is disposed side by side at intervals in the circumferential direction of the main body 1. The induced magnetic field is formed when electricity is applied to the solenoid coil 31.

The end connection piece 4 is provided on two opposite end surfaces of the main body 1 based on the longitudinal direction. Two opposite ends of the core member 30 of the magnetic field forming body 3 based on the longitudinal direction are coupled to the end connection piece 4 while being in close contact with the end connection piece 4. In the embodiment illustrated in the drawings, first and second half end connection pieces 4a and 4b are each provided in the form of a half of a circular ring. The first half end connection piece 4a and the second half end connection piece 4b are assembled and coupled in the transverse direction, such that the single circular ring-shaped end connection piece 4 is implemented. All the plurality of magnetic field forming bodies 3 each has two opposite ends tightly coupled to the end connection pieces 4. That is, the two opposite ends of each of the core members 30 of the magnetic field forming bodies 3 are coupled to the end connection pieces 4, such that the core members 30 are electromagnetically connected to one another. In the embodiment illustrated in the drawings, the core member 30 is coupled to a transverse lateral surface of the end connection piece 4 while being in close contact with the transverse lateral surface of the end connection piece 4. With this configuration, the magnetic force lines of the induced magnetic field formed by the magnetic field forming bodies 3 concentratedly flow in the longitudinal direction in the hollow portion of the main body 1 along the tendon 200.

Figure 12A:
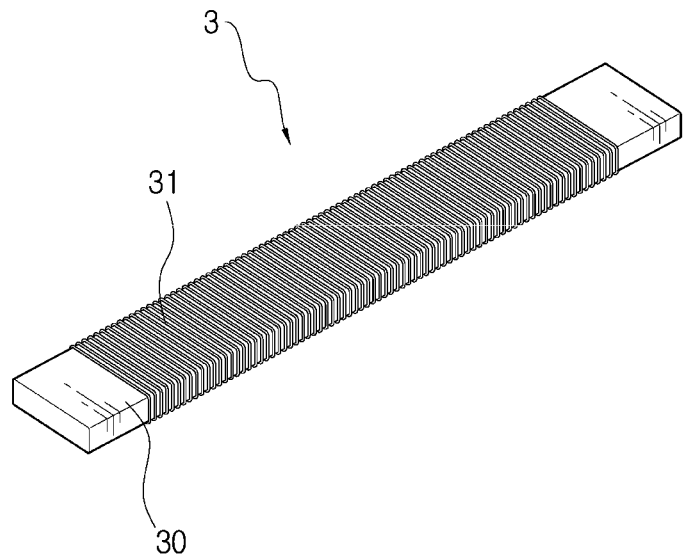
FIG. 12A is a schematic perspective view illustrating only a magnetic field forming body.
Figure 12B:
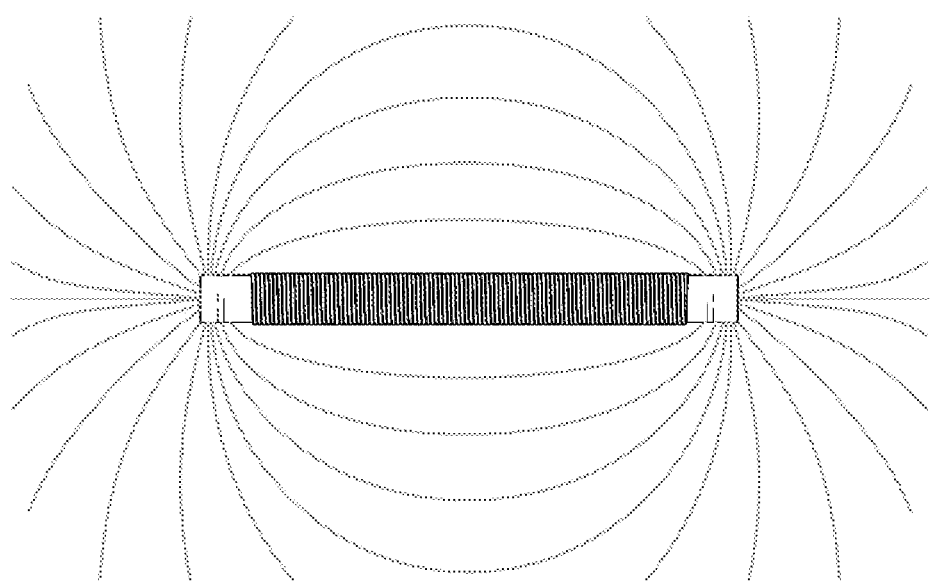
FIG. 12B is a transverse side view illustrating a schematic magnetic field forming body and illustrating a pattern of magnetic force lines generated by the magnetic field forming body illustrated in FIG. 12A.

FIG. 12A is a schematic perspective view illustrating only the magnetic field forming body 3. FIG. 12B is a schematic transverse side view of the magnetic field forming body 3. FIG. 12B illustrates a pattern of the magnetic force lines formed by the magnetic field forming body 3 illustrated in FIG. 12A. The magnetic field forming body 3 includes the core member 30 and the solenoid coil 31. The core member 30 is provided in the form of a bar extending in the longitudinal direction. The solenoid coil 31 is wound around the outer surface of the core member 30. Therefore, an electromagnet in the form of a "rod magnet" is made by the core member 30 when electricity is applied to the solenoid coil 31, and the induced magnetic field having the magnetic force lines formed in the pattern illustrated in FIG. 12B. In order to monitor the tendon 200, it is important that the magnetic force lines of the induced magnetic field concentratedly flow along the tendon 200. That is, it is important that the magnetic force lines flow into the hollow portion of the main body 1. As described above, this is because the induced magnetic field outside the main body, which is formed outside the main body 1, causes a measurement error of the search coil 2.

Figure 13:
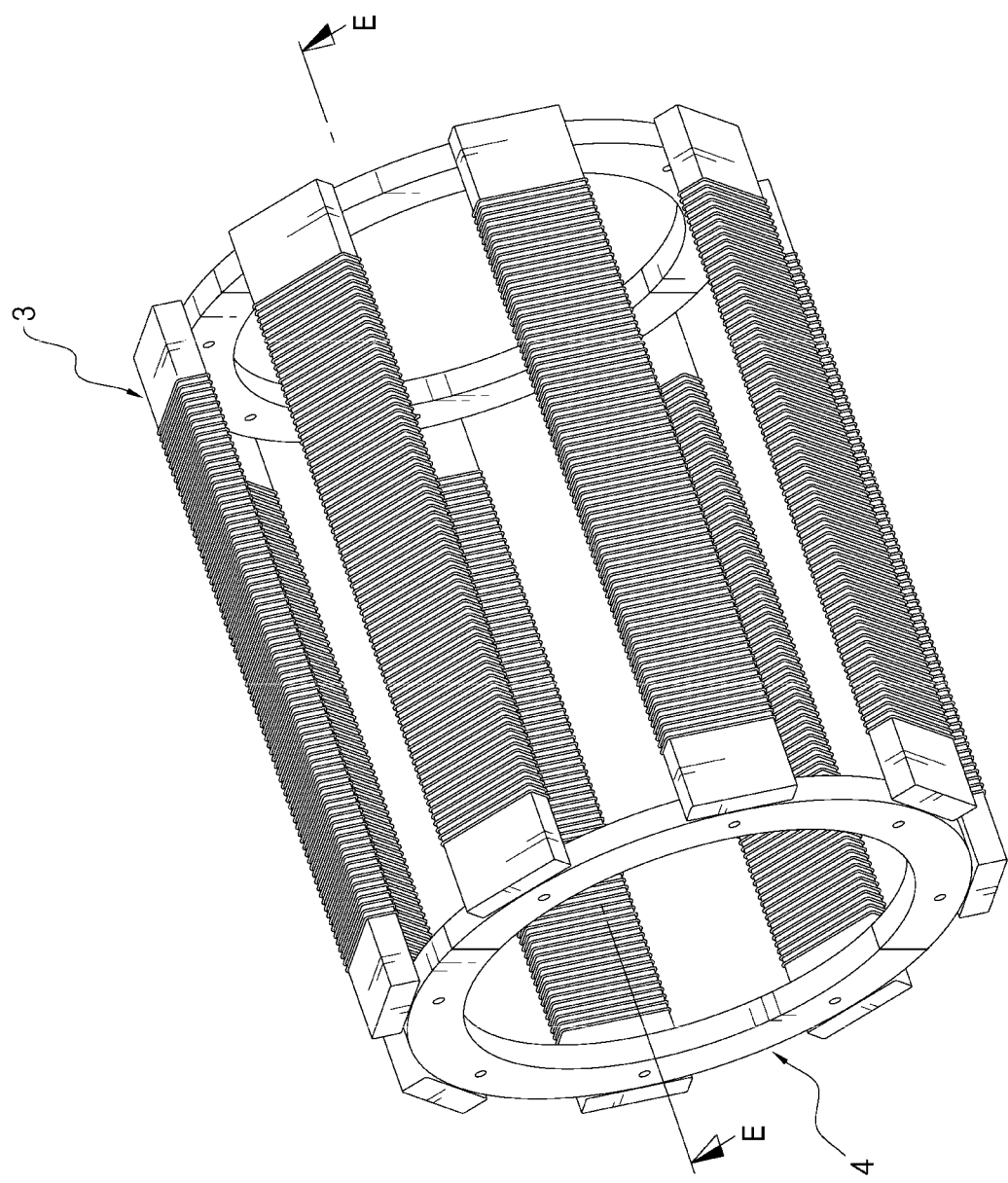
FIG. 13 is a schematic perspective view illustrating only end connection pieces and a magnetic field forming body of the tendon diagnosis device of the present invention.
Figure 14A:
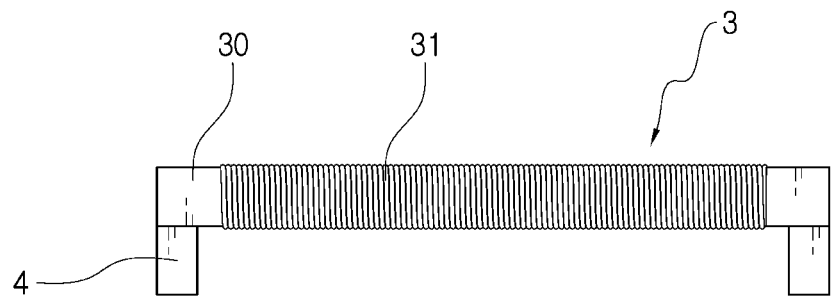
FIG. 14A is a schematic transverse cross-sectional side view taken along arrow E-E in FIG. 13.
Figure 14B:
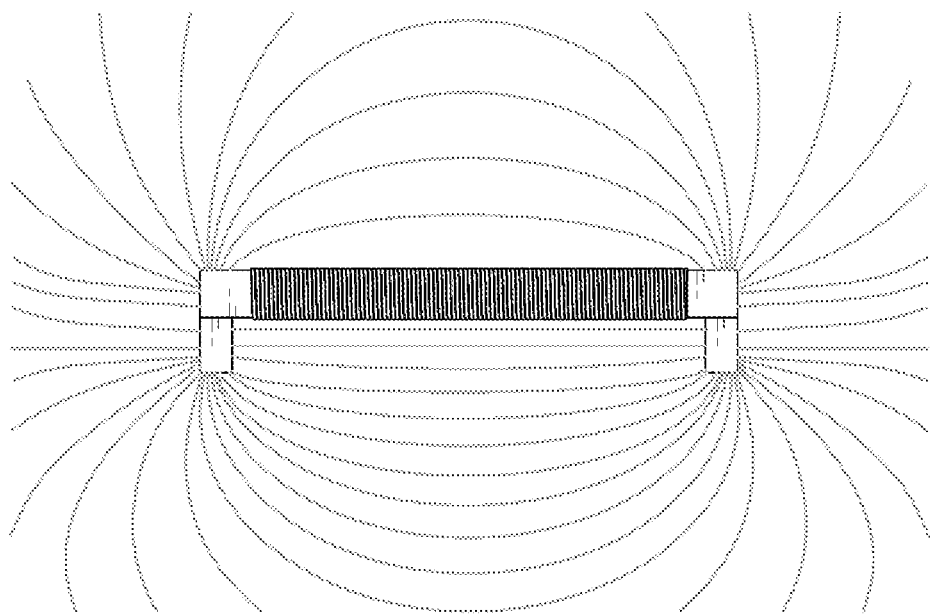
FIG. 14B is a transverse cross-sectional side view illustrating, in FIG. 14A, magnetic force lines of a magnetic field generated by the magnetic field forming body and the end connection piece of the present invention.

In the present invention, the plurality of magnetic field forming bodies 3 is installed at intervals outside the main body 1 along the circumference of the main body 1. In this case, the two opposite ends of the core member 30 are electromagnetically connected and coupled to the end connection pieces 4. The end connection piece 4 is made of a metallic material that may have magnetism. FIG. 13 is a schematic perspective view illustrating only the end connection pieces 4 and the magnetic field forming body 3 of the tendon diagnosis device 100. FIG. 14A is a schematic transverse cross-sectional side view taken along arrow E-E in FIG. 13. FIG. 14A illustrates a coupling structure between the end connection pieces 4 and one of the magnetic field forming bodies 3. FIG. 14B is a schematic transverse cross-sectional side view illustrating, in FIG. 14A, the magnetic force lines of the induced magnetic field formed by the magnetic field forming body 3 and the end connection pieces 4.

The two opposite ends of the core member 30 are electromagnetically connected and coupled to the end connection pieces 4 while being in contact with the end connection pieces 4. In this state, when electricity is applied to the solenoid coil 31, the core member 30 and the end connection pieces 4 are shaped like a "horseshoe magnet", as illustrated in FIGS. 14A and 14B. Therefore, the induced magnetic field is formed in a shape in which the magnetic force lines start along an inner circumferential surface of one end connection piece 4 and enter an inner circumferential surface of the other end connection piece 4 positioned opposite to one end connection piece 4 in the longitudinal direction. That is, in the present invention, the induced magnetic field is formed in a shape in which the magnetic force lines concentratedly flow in the hollow portion of the main body 1, and the flow of the magnetic force lines to the outside of the main body 1 is minimized. As described above, in the present invention, the induced magnetic field is formed in a shape in which the induced magnetic field, which is formed outside the main body and causes a measurement error of the search coil 2, is minimized. Therefore, the occurrence of error is minimized when the search coil 2 measures the induced voltage, and thus the accuracy and reliability of the measurement are significantly improved.

Figure 15:
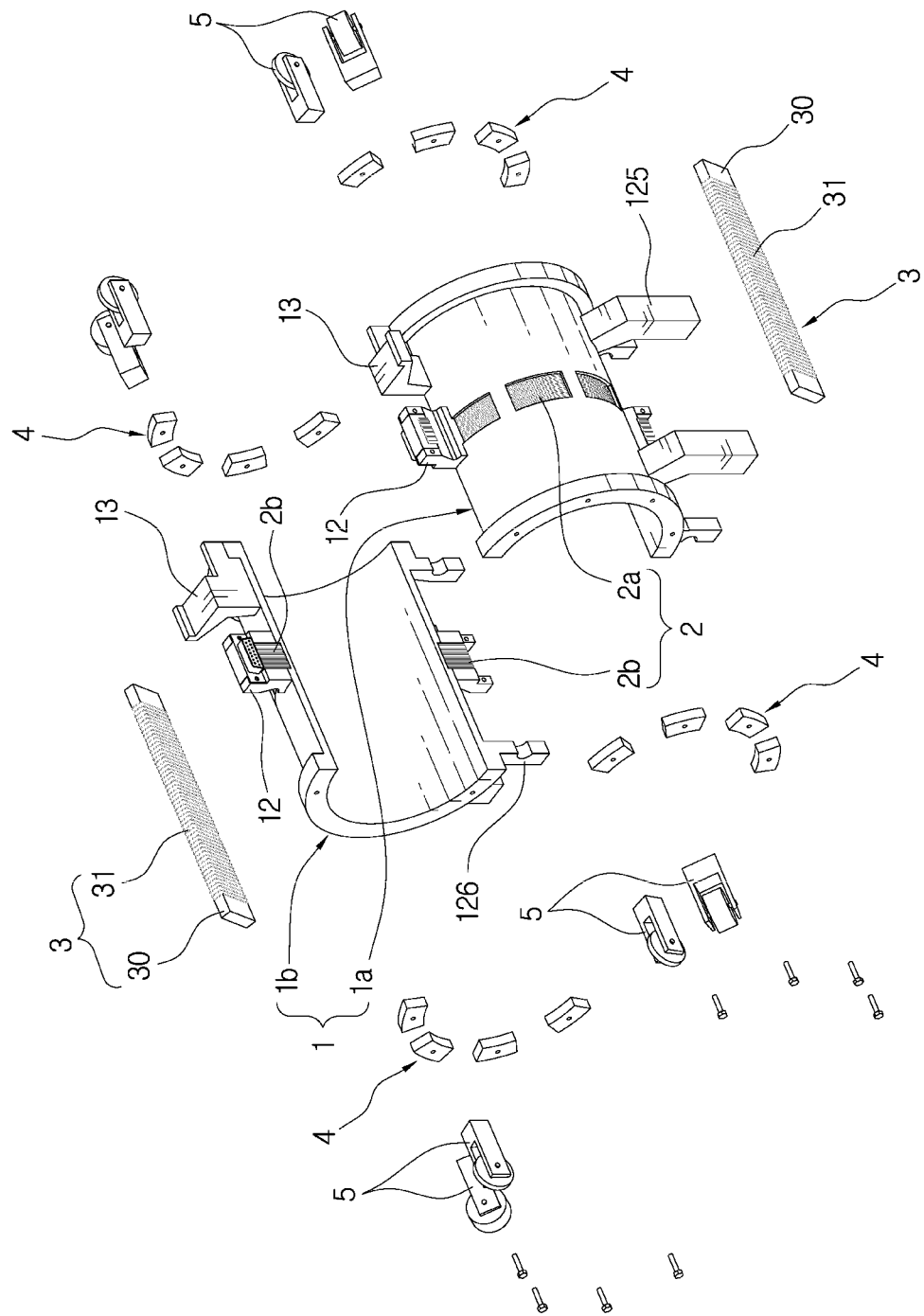
FIG. 15 is a schematic exploded perspective view corresponding to FIG. 5 and illustrating a tendon diagnosis device according to a second embodiment in which an end connection piece is configured as separated steel pieces.
Figure 16:
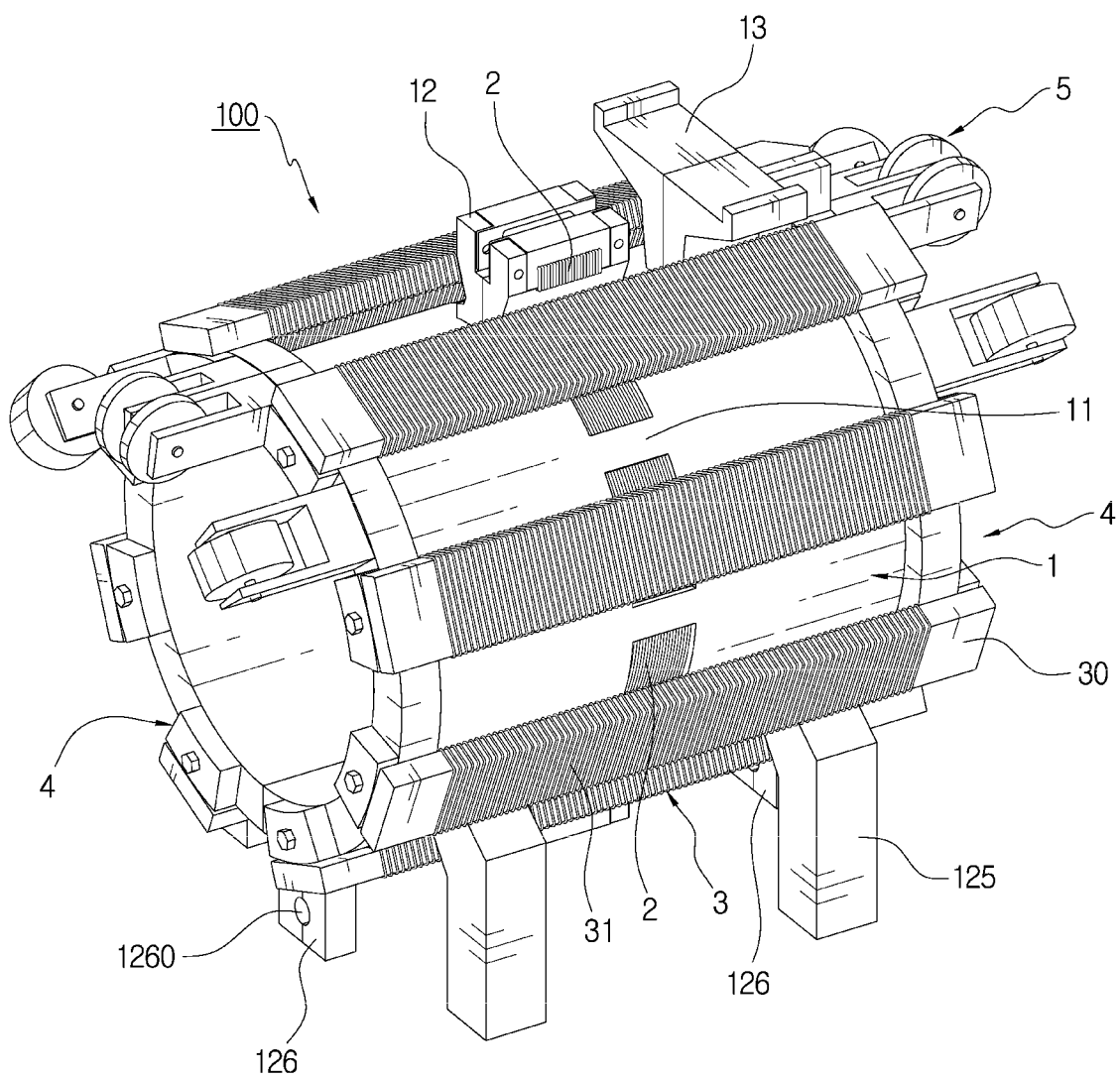
FIG. 16 is a schematic assembled perspective view corresponding to FIG. 2 and illustrating the tendon diagnosis device according to the second embodiment illustrated in FIG. 15.

In the above-mentioned embodiment, the end connection piece 4 is configured as a single circular ring-shaped member. However, in the present invention, the end connection piece 4 need not necessarily be configured as a single circular ring-shaped member implemented by assembling the first and second half end connection pieces 4a and 4b. A separate end connection piece 4 may be provided for each of the plurality of magnetic field forming bodies 3. That is, the end connection piece 4 may include separated steel pieces each having a thickness, and the end connection pieces 4 may be disposed at intervals along the circumference of the main body 1 and provided on the two opposite end surfaces of the main body 1 based on the longitudinal direction while corresponding to arrangement intervals between the magnetic field forming bodies 3. FIG. 15 is a schematic exploded perspective view corresponding to FIG. 5 and illustrating a tendon diagnosis device according to a second embodiment of the present invention. FIG. 15 illustrates that the end connection piece 4 includes steel pieces disposed to be spaced apart from one another. FIG. 16 is a schematic assembled perspective view corresponding to FIG. 2 and illustrating the tendon diagnosis device according to the second embodiment illustrated in FIG. 15. Because the other configurations of the embodiment illustrated in FIGS. 15 and 16 are identical to those of the embodiment, a repeated description thereof will be omitted.

In the state in which the tendon diagnosis device 100 of the present invention is installed on the tendon or the bridge cable 200, the tendon diagnosis device 100 may work while moving in the longitudinal direction along the tendon or the bridge cable 200. To this end, the tendon diagnosis device 100 may further include the guide wheels 5. As illustrated in the drawings, the guide wheel 5 may be configured as a rolling wheel. The plurality of guide wheels 5 may be provided at the two opposite ends of the main body 1 based on the longitudinal direction.

Figure 17:
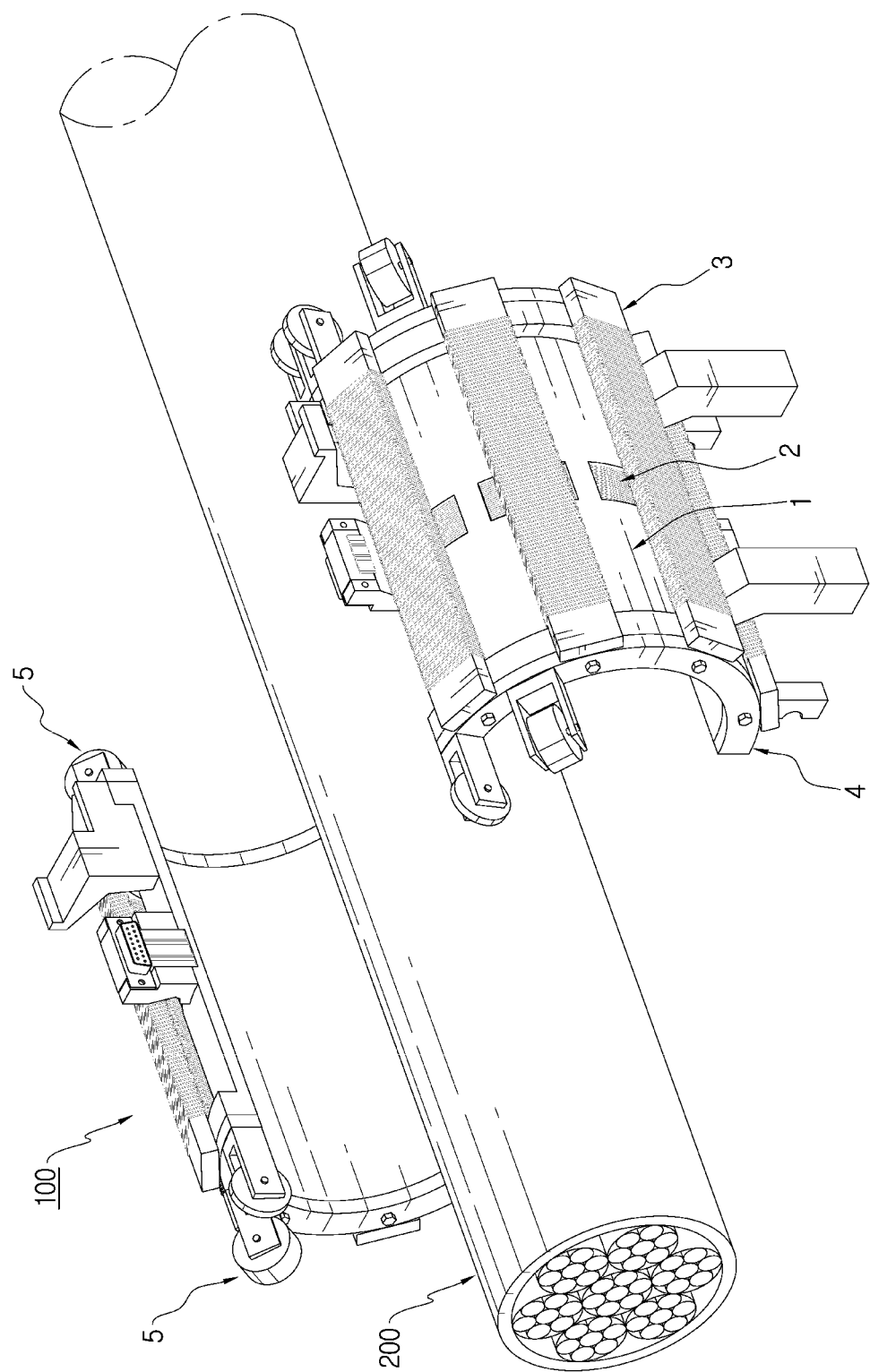
FIG. 17 is a schematic perspective view illustrating a state in which first and second half main bodies according to the first embodiment of the present invention are installed on a tendon.

As illustrated in FIG. 1, the tendon diagnosis device 100 according to the first and second embodiments of the present invention is installed while surrounding the outer portion of the bridge cable so that the bridge cable penetrates the hollow portion of the main body 1. FIG. 17 is a schematic perspective view illustrating a state in which the tendon diagnosis device 100 of the first embodiment is installed on the bridge cable 200 including the tendons. The first and second half search coils 2a and 2b are installed on the outer surfaces of the first and second half main bodies 1a and 1b while being in close contact with the outer surfaces of the first and second half main bodies 1a and 1b. The main body 1 is implemented as the first and second half main bodies 1a and 1b are assembled and coupled to each other while surrounding the bridge cable at the two opposite sides of the bridge cable based on the transverse direction. Further, the first and second half search coils 2a and 2b are electrically connected to each other. The end connection pieces 4 are implemented as the first and second half end connection pieces 4a and 4b are assembled to one another while surrounding the bridge cable at the two opposite sides of the bridge cable 200 based on the transverse direction. Before or after the process of forming the end connection pieces 4 or simultaneously with the process of forming the end connection pieces 4, the end connection pieces 4 are coupled to the two opposite ends of the main body 1 based on the longitudinal direction. After the end connection pieces 4 are installed, the plurality of magnetic field forming bodies 3 are disposed side by side in the circumferential direction, and the two opposite ends of each of the magnetic field forming bodies 3 are coupled to the end connection pieces 4 while being in close contact with the end connection pieces 4. The magnetic field forming body 3 has the configuration in which the solenoid coil 31 is wound around the core member 30. When the magnetic field forming bodies 3 are coupled to the end connection pieces 4, the end connection pieces 4 and the plurality of magnetic field forming bodies 3 constitute the integrated magnetic element.

The process of assembling and coupling the first and second half main bodies 1a and 1b, the process of electrically connecting the first and second half search coils 2a and 2b, the process of assembling the first and second half end connection pieces 4a and 4b and coupling the first and second half end connection pieces 4a and 4b to the main body 1, and the process of coupling the plurality of magnetic field forming bodies 3 to the end connection pieces 4 are described as being sequentially performed. However, the order of the above-mentioned processes may be changed for convenience.

As the two members (the two members separated in the transverse direction), which constitute the tendon diagnosis device 100, are assembled while surrounding the tendon or the bridge cable in the transverse direction, the tendon diagnosis device 100 is installed on the tendon or the bridge cable. Therefore, the tendon diagnosis device 100 may be easily installed on the outer portion of the tendon even though the tendon is elongated in the longitudinal direction. Therefore, an operator may very conveniently perform the process of installing the tendon diagnosis device 100 on the tendon or the bridge cable at a desired position and perform tasks.

In case that the tendon diagnosis device 100 further includes the plurality of guide wheels 5, the guide wheels 5 come into contact with the outer surface of the tendon at the time of installing the tendon diagnosis device 100 on the bridge cable, such that the tendon diagnosis device 100 is suspended from the tendon in a state in which a necessary interval is automatically defined between the inner surface of the hollow portion of the main body 1 and the outer surface of the bridge cable. In case that the guide wheels 5 are provided, the tendon diagnosis device 100 may very conveniently move along the tendon 200, which also significantly improves the working efficiency.

Figure 18:
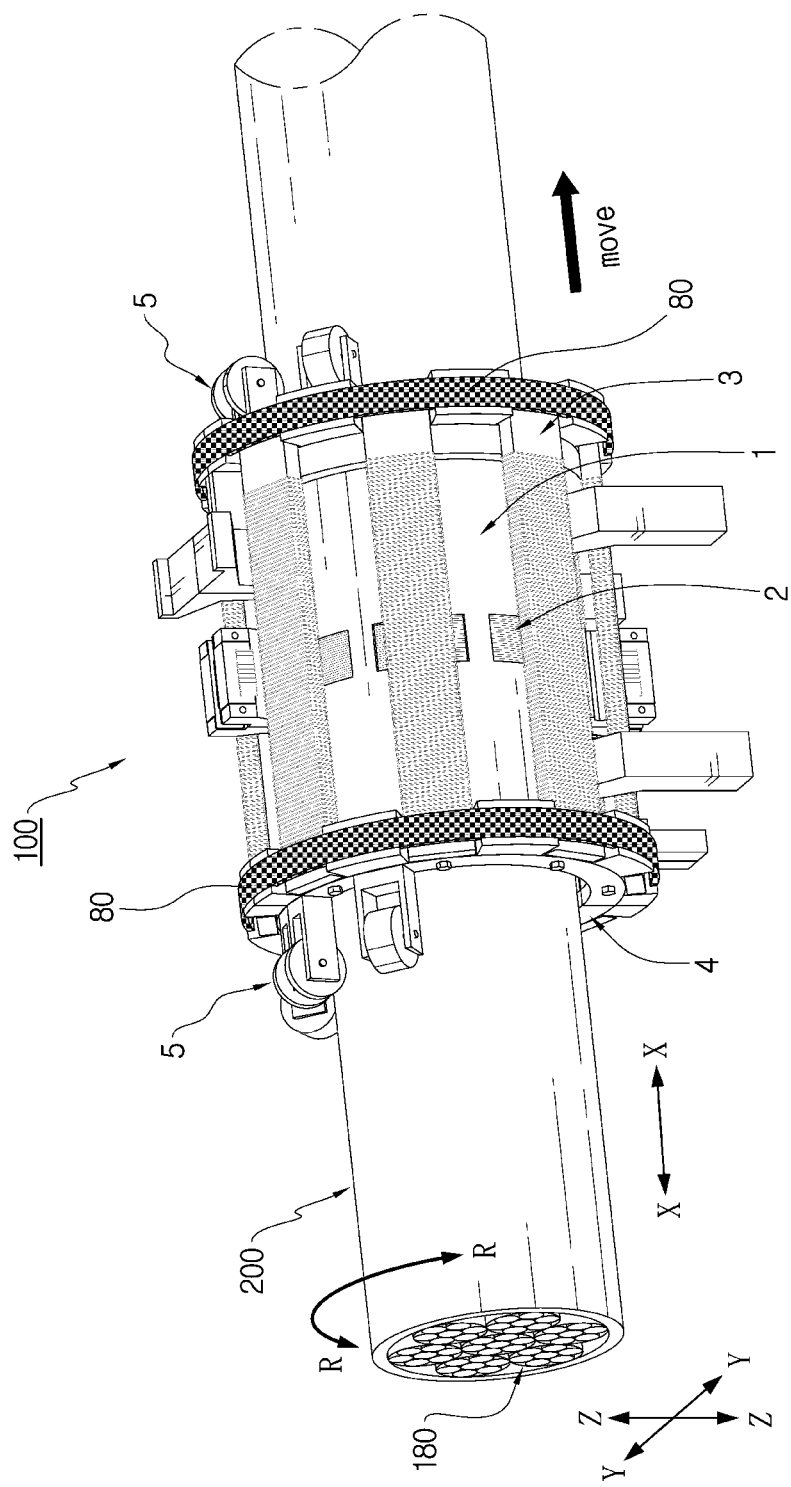
FIG. 18 is a schematic perspective view corresponding to FIG. 1 and illustrating a state in which the tendon diagnosis device according to the second embodiment of the present invention is installed on a tendon.
Figure 19A:
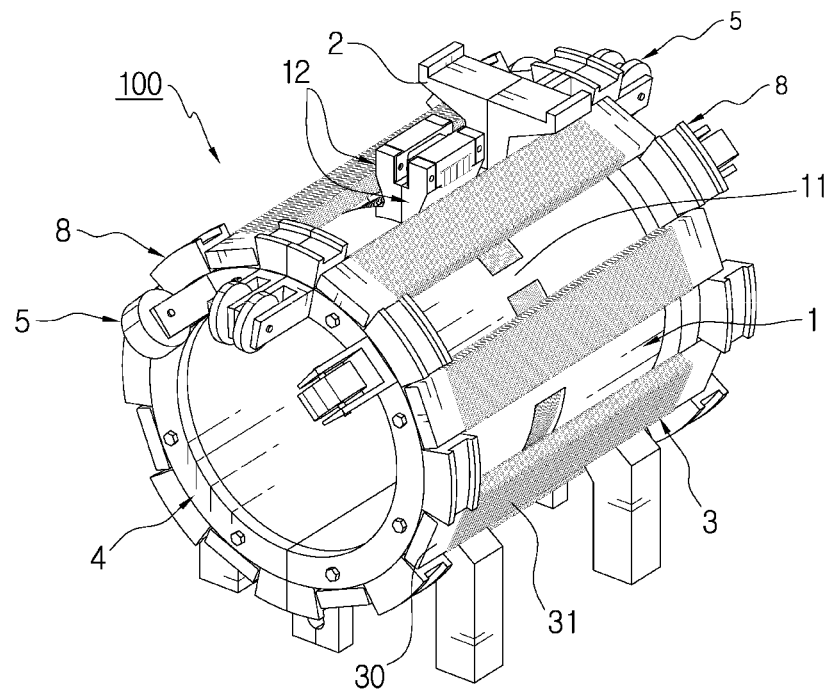
FIGS. 19A and 19B are schematic perspective views illustrating only the tendon diagnosis device illustrated in FIG. 18.
Figure 19B:
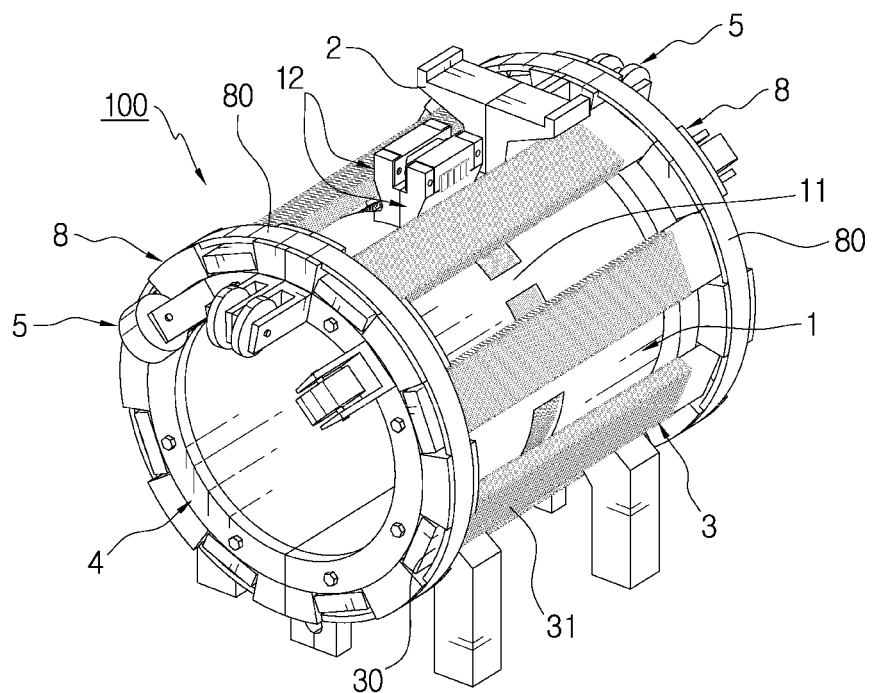

FIG. 18 is a schematic perspective view illustrating a state in which a tendon diagnosis device 100 according to a third embodiment of the present invention is installed on the outer portion of the bridge cable 200 including the tendons. FIGS. 19A and 19B are schematic perspective views illustrating only the tendon diagnosis device in FIG. 18. FIG. 19A illustrates a state in which bands 80 are excluded. FIG. 19B illustrates a state in which the bands 80 are wound. The tendon diagnosis device 100 illustrated in FIGS. 18, 19A, and 19B further includes band installation portions 8 in addition to the components of the tendon diagnosis device 100 according to the first embodiment described above. The band installation portions 8 are further provided at the two opposite ends of the main body 1 and disposed at a circumferential interval between the plurality of magnetic field forming bodies 3. That is, the band installation portions 8 are formed at an interval and provided at the two opposite ends of the main body 1 along the circumference of the main body 1. In case that the band installation portions 8 are provided as described above, the bands 80 are placed on the band installation portions 8 and wound around the outer circumferential surface of the main body 1. Therefore, the two members of the tendon diagnosis device 100, which are separated in the transverse direction, are more securely assembled in the transverse direction. That is, the bands 80 are wound around the band installation portions 8 and fix the first and second half main bodies 1a and 1b in the state in which the first and second half main bodies 1a and 1b approach each other in the transverse direction and surround the bridge cable, such that the first and second half main bodies 1a and 1b may be more securely coupled integrally. In case that a concave portion is formed in a surface of the band installation portion 8, the band 80 is positioned in the concave portion. Therefore, the band 80 does not deviate from the band installation portion 8. A thickness of the band installation portion 8 may be larger than a thickness of the magnetic field forming body 3. In this case, the band installation portion 8 further protrudes from the outer surface of the main body 1 than the magnetic field forming body 3. When the band installation portion 8 protrudes as described above, it is possible to prevent an accident in which the operator touches the magnetic field forming body 3 with his/her hand, which causes an injury to the operator or damage to the magnetic field forming body 3. The other configurations, features, and effects of the tendon diagnosis device 100 according to the third embodiment illustrated in FIGS. 18 and 19 are identical to those of the tendon diagnosis device 100 according to the first embodiment described above. In addition, as in the second embodiment described with reference to FIGS. 15 and 16, the configuration in which the end connection piece 4 includes the separated steel pieces may also be applied to the third embodiment illustrated in FIGS. 18 and 19.

When electricity is applied to the solenoid coils 31 in the state in which the tendon diagnosis device 100 is installed on the tendon or the bridge cable, the core members 30 are magnetized. When the core members 30 are magnetized, the magnetic field forming bodies 3 form the induced magnetic field in a shape in which the magnetic force lines pass through the hollow portion of the main body 1 in the longitudinal direction. When a sectional force (tensile stress or the like) of the tendon changes, the induced magnetic field also changes. The search coil 2 is used to measure the induced voltage induced by the change in induced magnetic field. It is possible to recognize a degree of and change in sectional force of the tendon by using the measured induced voltage on the basis of the inverse magnetostriction effect. The publicly-known specific computation, analysis configuration, and method may be used to recognize the degree of and change in sectional force (tensile stress) of the tendon on the basis of the measured induced voltage, detect whether the tendon is damaged, and detect a damaged position and a degree of damage. Specifically, the technology disclosed in Korean Patent No. 10-2178721 may be used to recognize a state of the tendon and diagnose the bridge cable.

Next, a bridge cable diagnosis method of diagnosing a state of the bridge cable by using the tendon diagnosis device 100 of the present invention will be described. In addition, a bridge cable diagnosis system for performing the bridge cable diagnosis method of the present invention will be described.

Figure 20:
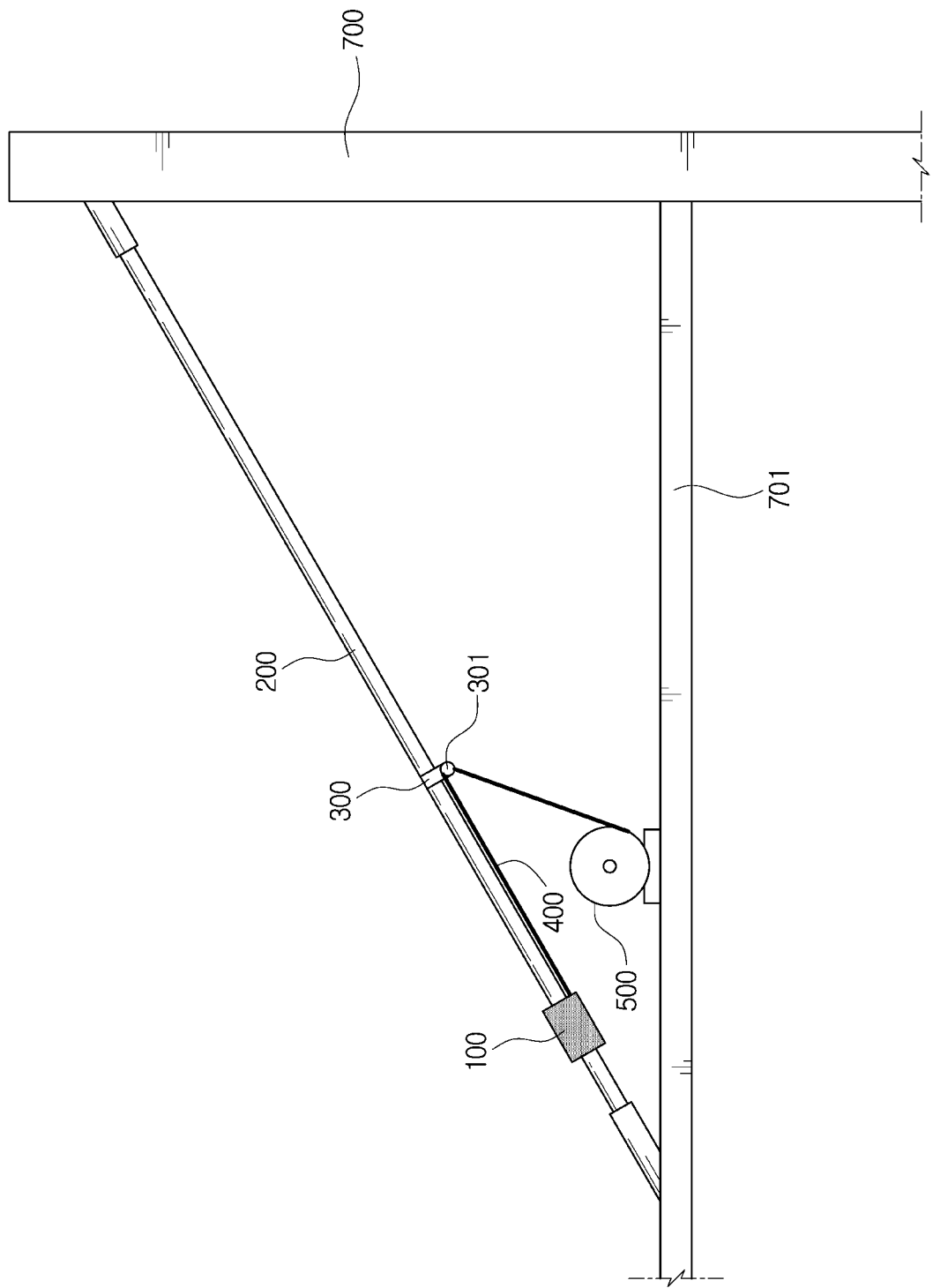
FIG. 20 is a schematic view illustrating a configuration of a bridge cable diagnosis system of the present invention.

FIG. 20 is a schematic view illustrating a configuration of the bridge cable diagnosis system according to the present invention. In FIG. 20, reference numeral 700 indicates a bridge pylon 700, and reference numeral 701 indicates an upper bridge structure 701. The upper bridge structure 701 includes a bridge bottom plate configured to support the bridge cable 200. The bridge cable diagnosis system according to the present invention includes the tendon diagnosis device 100, a hoisting wire 400, a pulley 301 around which the hoisting wire 400 is wound to change a direction thereof, a traveling robot 300, and a winch 500.

Specifically, the tendon diagnosis device 100 is installed on the bridge cable 200. The tendon diagnosis device 100 has been described in detail. The traveling robot 300 is installed on the bridge cable 200. The traveling robot 300 is installed on the bridge cable 200 and disposed at a position higher than the tendon diagnosis device 100. The traveling robot 300 pulls the tendon diagnosis device 100 upward while moving along the bridge cable 200. The traveling robot 300 is coupled to the bridge cable 200 and moves along the bridge cable 200 by being controlled by the operator in a wired/wireless manner or by autonomous operating.

The traveling robot 300 is equipped with the pulley 301. The hoisting wire 400 is wound around the pulley 301 to change the direction thereof. One end of the hoisting wire 400 is coupled to the winch 500. The other end of the hoisting wire 400 is coupled to the tendon diagnosis device 100. Therefore, as illustrated in FIG. 20, the tendon diagnosis device 100 and the traveling robot 300 are installed on the bridge cable 200. The other end of the hoisting wire 400 is coupled to the tendon diagnosis device 100. One end of the hoisting wire 400 extends toward the traveling robot 300 and is wound around the pulley 301 to change the direction thereof, and then one end of the hoisting wire 400 is coupled to the winch 500. Therefore, the bridge cable diagnosis system according to the present invention is in an "initially installed state".

In this case, the tendon diagnosis device 100 may be temporarily fixed so as not to move. In some instances, tension may be applied to the hoisting wire 400 to temporarily prevent the tendon diagnosis device 100 from moving.

After the bridge cable diagnosis system is placed in the initially installed state, the bridge cable diagnosis system diagnoses the bridge cable in two types of modes of the bridge cable diagnosis method according to the present invention to be described below.

Figure 21:
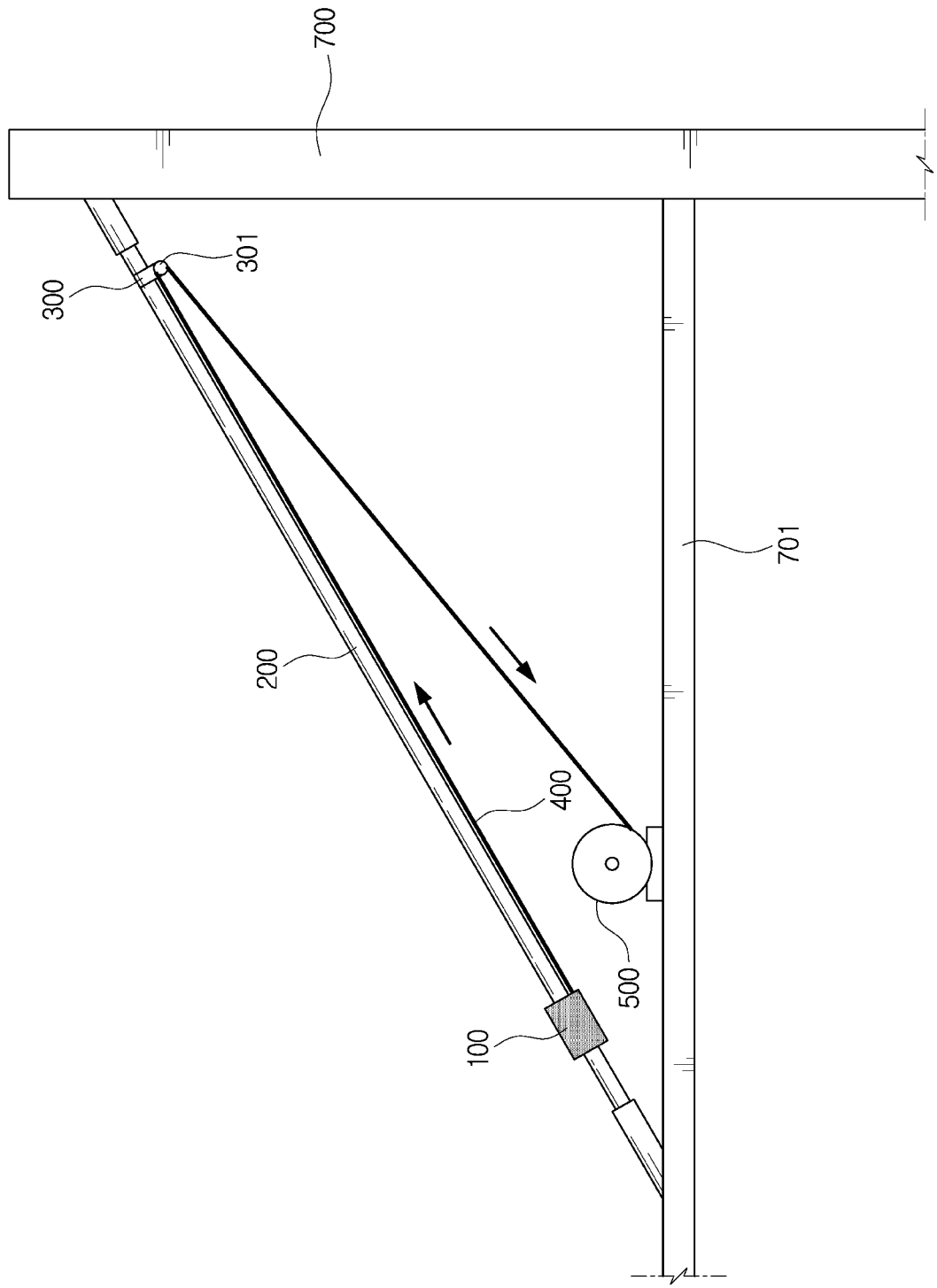
FIGS. 21 and 22 are schematic views sequentially illustrating a process in which a diagnosis method is performed in a first mode of the present invention subsequent to the state in FIG. 20.
Figure 22:
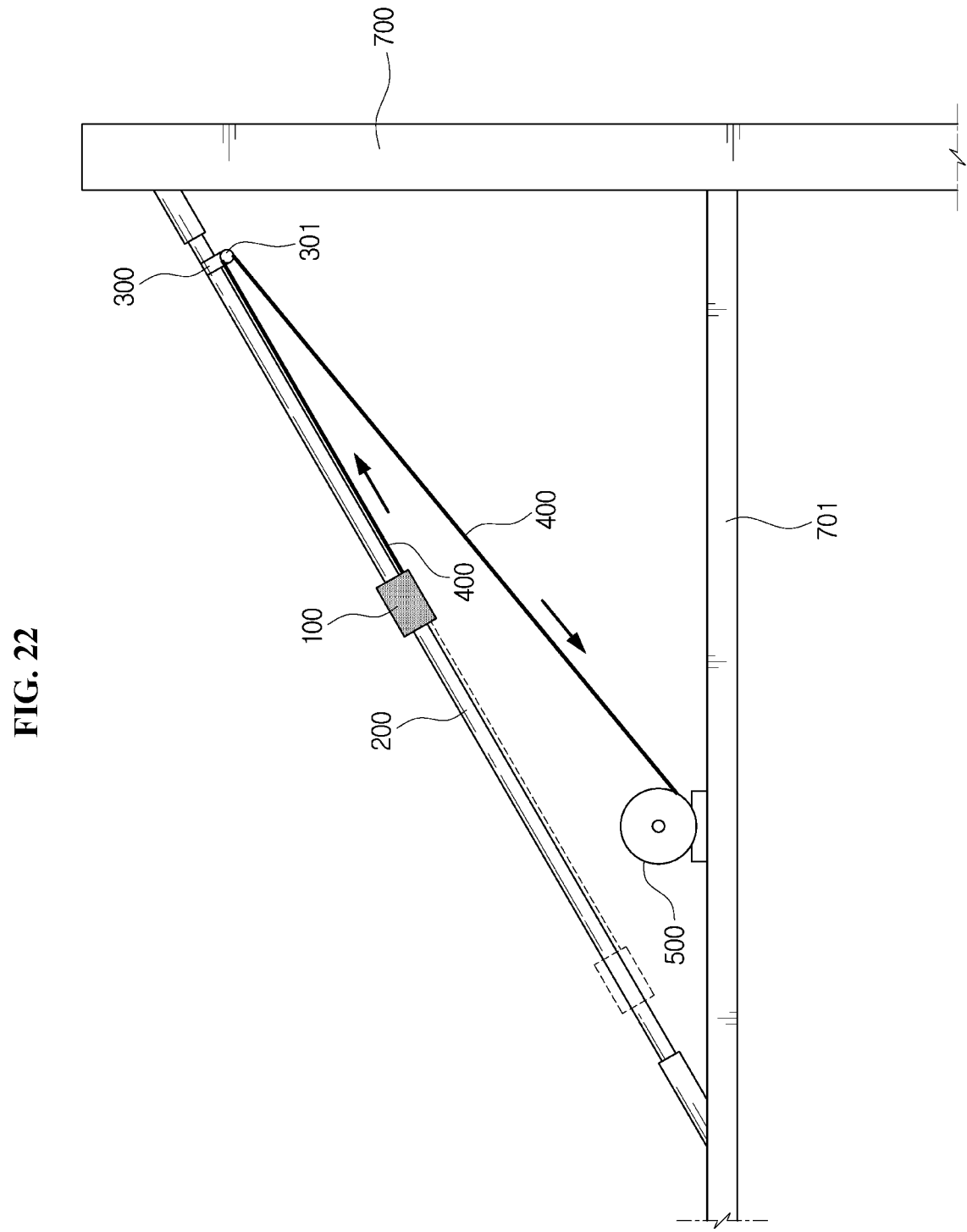

The bridge cable diagnosis method according to the first embodiment of the present invention performs the diagnosis while pulling and moving the tendon diagnosis device 100 "upward" toward an upper side of the inclined bridge cable. FIGS. 21 and 22 are schematic views sequentially illustrating a process in which the diagnosis method is performed in a first mode of the present invention subsequent to the state in FIG. 1. As illustrated in FIG. 20, first, the traveling robot 300 is moved toward the upper side of the bridge cable 200 and moved to a fixed position at a desired height. In this case, the tendon diagnosis device 100 is temporarily fixed or the tension of the hoisting wire 400 is adjusted so that the tendon diagnosis device 100 does not move. The movement of the traveling robot 300 may be controlled by the operator in a wireless or wired manner or performed by the autonomous operation of the traveling robot 300.

After the traveling robot 300 is moved upward to a required position, the position of the traveling robot 300 is fixed. Further, the tendon diagnosis device 100 is placed in a movable state. The winch 500 operates to impart tension to the hoisting wire 400 and pull and hoist the tendon diagnosis device 100 upward. As illustrated in FIG. 22, the tendon diagnosis device 100 is sequentially moved at a desired speed to a desired diagnosis position, and the tendon diagnosis device 100 is operated at a separate diagnosis position, such that the state of the bridge cable is diagnosed. In FIG. 22, the dotted line indicates the position of the tendon diagnosis device 100 in FIG. 21, i.e., indicates the position before the tendon diagnosis device 100 is moved upward.

Figure 23:
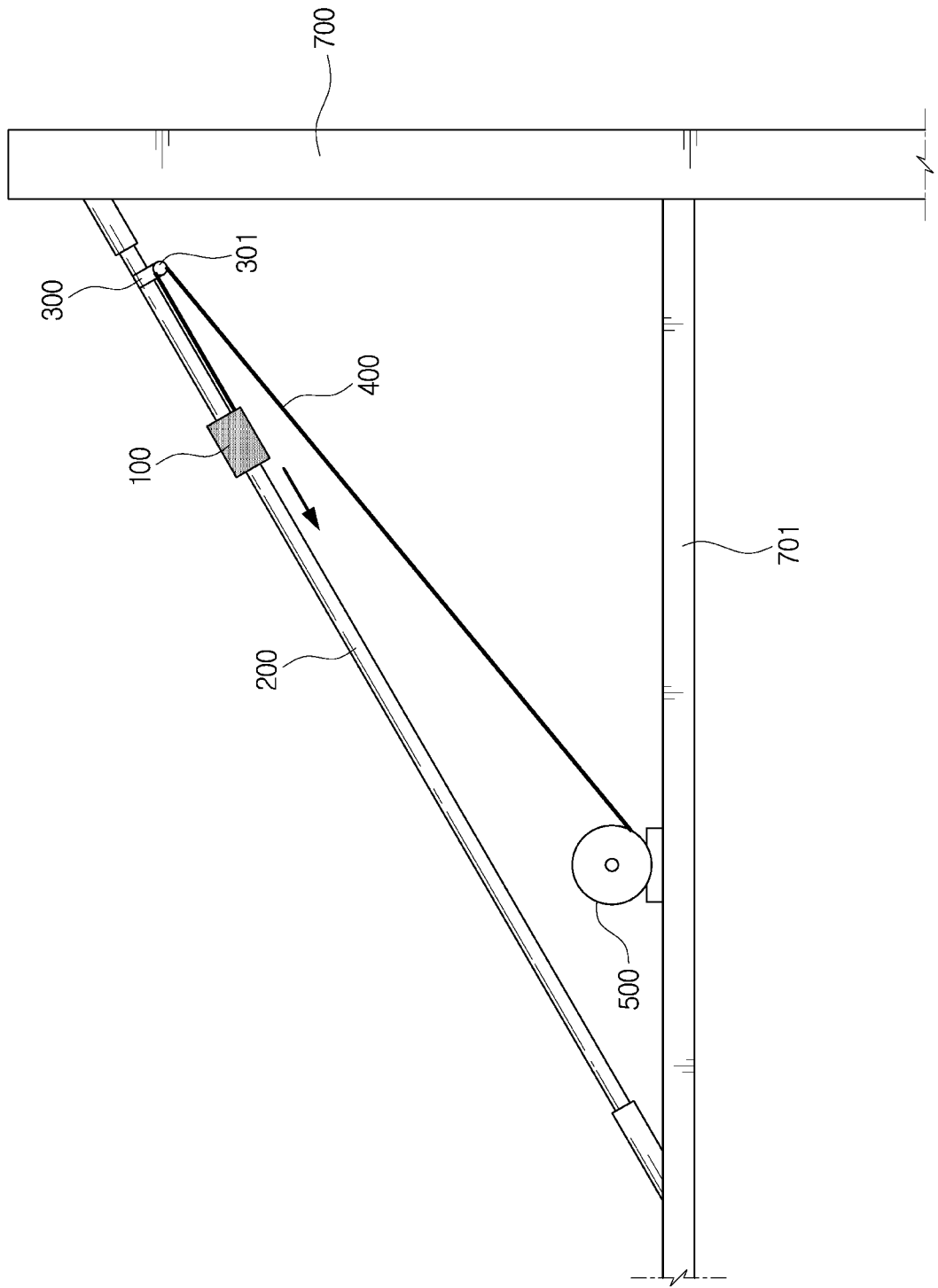
FIGS. 23 and 24 are schematic views sequentially illustrating a process in which the diagnosis method is performed in a second mode of the present invention subsequent to the state in FIG. 20.
Figure 24:
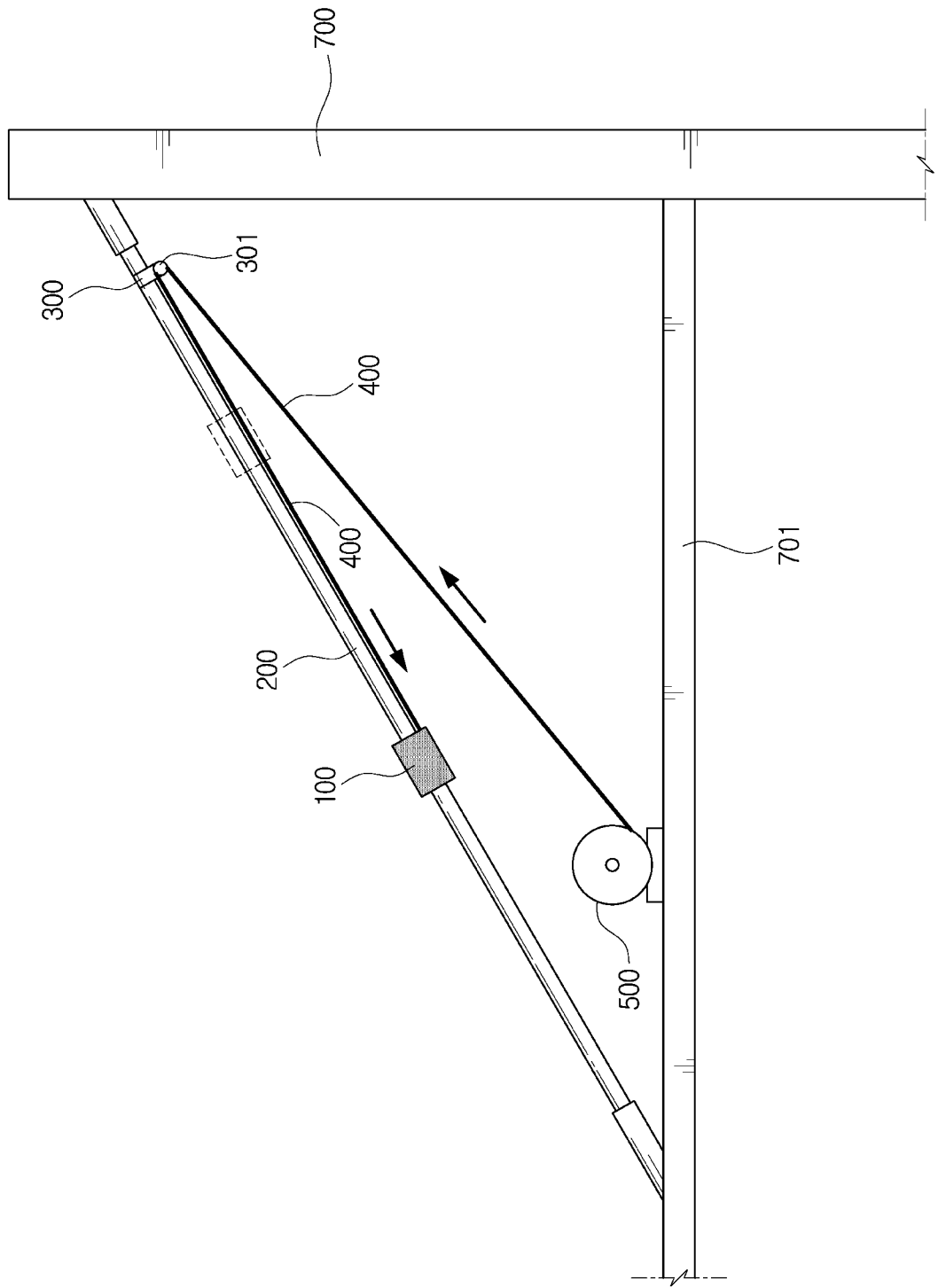

FIGS. 23 and 24 are schematic views sequentially illustrating a process in which the diagnosis method is performed in a second mode of the present invention subsequent to the state in FIG. 20. The bridge cable diagnosis method according to the second embodiment of the present invention performs the diagnosis while moving the tendon diagnosis device 100 "downward" along the inclined bridge cable 200. As illustrated in FIG. 23, the traveling robot 300 is moved toward the upper side of the bridge cable 200 to a desired height. The tendon diagnosis device 100 is also moved toward the upper side of the bridge cable 200 to a desired height. The winch 500 operates to pull the hoisting wire 400 in a state in which the traveling robot 300 moved to the desired height is fixed, such that the tendon diagnosis device 100 is moved to a diagnosis initiation position at the upper side of the bridge cable.

Next, as illustrated in FIG. 24, when the winch 500 operates to release the hoisting wire 400 to the required extent, the tendon diagnosis device 100 moves downward along the bridge cable 200. In this case, the tension of the hoisting wire 400 is adjusted, such that the tendon diagnosis device 100 is sequentially moved downward to a desired diagnosis position at a desired speed, and the tendon diagnosis device 100 operates at a separate diagnosis position, such that the state of the bridge cable is diagnosed. In FIG. 24, the dotted line indicates the position of the tendon diagnosis device 100 in FIG. 23, i.e., indicates the position before the tendon diagnosis device 100 is moved downward.

According to the bridge cable diagnosis method and the diagnosis system according to the present invention, the tendon diagnosis device 100 diagnoses the state of the bridge cable at the predetermined diagnosis position while moving upward or downward. The upward or downward movement of the tendon diagnosis device 100 is performed by adjusting the tension of the hoisting wire 400. The adjustment of the tension of the hoisting wire 400 is performed by the operation of the winch 500. The operation of the winch 500 may be very easily and precisely adjusted as necessary. Therefore, the state of the tension of the hoisting wire 400 may also be precisely adjusted to a desired degree. Therefore, the movement of the tendon diagnosis device 100 may also be precisely controlled, such that the tendon diagnosis device 100 may be accurately positioned at the predetermined diagnosis position and diagnose the bridge cable. Therefore, there is an advantage in that the efficiency and reliability of the diagnosis of the bridge cable are improved.

In particular, in the present invention, the traveling robot 300, which is configured to be moved by being controlled by the operator in a wired/wireless manner or configured to move autonomously, is moved to a high position in the vicinity of the pylon of the bridge, and the tendon diagnosis device 100 is moved upward or downward by the movement of the traveling robot 300. Therefore, the operator need not directly move upward to a high position on the pylon, and the risk associated with working at a high height is prevented in advance, such that the operator may safely diagnose the bridge cable.

As described above, the tendon diagnosis device 100 according to the present invention may be used to measure the induced voltage caused by the change in induced magnetic field, thereby detecting whether the tendon is damaged and detecting a damaged position and a degree of damage. Theoretical values of the induced voltage of the tendon using the measurement value of the induced voltage according to the damage type are recognized in advance for the same specimen as the tendon intended to be monitored. Further, on site, the induced voltage related to the tendon of the actual bridge cable is measured. It is possible to quantitatively recognize how many wire rods are damaged at which locations on the bridge cable by comparing the measurement value of the induced voltage of the tendon and the theoretical value of the induced voltage.

INDUSTRIAL APPLICABILITY

According to the present invention, it is possible to quantitatively recognize whether the tendon is damaged, accurately detect the damaged position, and recognize the degree of damage. The appropriate solution, which is capable of accurately diagnosing the state of the bridge cable and thus coping with the damage to the tendon and the damage to the bridge cable caused by the damage to the tendon, may be anticipatively prepared and provided. It is possible to more safely maintain and manage the structure using the tendon (the bridge cable and the bridge equipped with the bridge cable).

The invention claimed is:

1. A tendon diagnosis device comprising:
a main body configured as a cylindrical member having a hollow portion and extending in a longitudinal direction;
a search coil wound around the main body and configured to measure an induced voltage induced by a change in induced magnetic field;
a plurality of magnetic field forming bodies each including a core member extending in the longitudinal direction, and a solenoid coil wound around an outer surface of the core member, the plurality of magnetic field forming bodies being configured to form the induced magnetic field; and
end connection pieces respectively coupled to two opposite end surfaces of the main body based on the longitudinal direction,
wherein the main body includes first and second half main bodies separated in a transverse direction,
wherein the search coil includes first and second half search coils tightly installed while being wound around outer surfaces of the first and second half main bodies along circumferences of the first and second half main bodies,
wherein the end connection pieces each include first and second half end connection pieces separated in the transverse direction,
wherein the main body is installed to surround an outer portion of a tendon so that the tendon is positioned in the hollow portion of the main body,
wherein the first and second half main bodies are coupled while surrounding the tendon in the transverse direction to define a cylindrical shape,
wherein the first and second half search coils are electrically connected,
wherein the first and second half end connection pieces are installed outside the tendon and coupled while surrounding the tendon in the transverse direction to define a circular ring,
wherein in a state in which the induced magnetic field is formed by applying a voltage to the solenoid coils, the search coils measure the induced voltage induced by a change in sectional force of the tendon or a change in induced magnetic field caused by damage to the tendon while moving along the tendon,
wherein two opposite ends of the core member of each of the magnetic field forming bodies are electromagnetically and continuously coupled to the end connection pieces so that magnetic force lines are induced to be concentrated in the hollow portion of the main body and flow along the tendon in the longitudinal direction,
wherein vertical protruding portions protrude in a vertical direction from positions at which the first and second half search coils are installed at upper and lower circumferential edges of the first and second half main bodies based on the vertical direction,
wherein electric wire passing holes, which are formed through the vertical protruding portions in the circumferential direction, are formed in portions of lower ends of the vertical protruding portions that are connected to the circumferential edges of the first and second half main bodies,
wherein the ends of the first and second half search coils wound around the circumferences of the first and second half main bodies pass through the electric wire passing holes, extend in the vertical direction while being in close contact with inner surfaces of the vertical protruding portions, and are positioned while standing in the vertical direction along the inner surfaces of the vertical protruding portions,
wherein the vertical protruding portions of the first and second half main bodies adjoin each other while facing each other when the first and second half main bodies are coupled,
wherein the ends of the first and second half search coils, which are in close contact with the inner surfaces of the vertical protruding portions while standing uprightly, also face each other while maintaining a vertical state,
wherein the first and second half search coils are electrically connected to each other outside the vertical protruding portions in a state in which planar member shapes defined by a plurality of electric wires of the first and second half search coils are positioned to extend in the longitudinal direction so as not to hinder the magnetic force lines flow in the longitudinal direction outside the main body, and
wherein the search coil is formed in a shape in which the electric wires of the first and second half search coils are spirally wound in the circumferential direction around the main body configured as a continuously cylindrical member.

2. The tendon diagnosis device of claim 1, wherein supports, which are provided in the form of a plurality of legs extending vertically downward, are provided on the outer surfaces of the first and second half main bodies, such that the tendon diagnosis device is stably placed on a floor without rolling in the transverse direction at the time of carrying, mounting, or storing the tendon diagnosis device.

3. The tendon diagnosis device of claim 1, wherein electric connectors are provided at the ends of the first and second half search coils and electrically connect the first and second half search coils,
wherein the electric connectors are installed on the vertical protruding portions, and
wherein the electric connectors are fastened to each other when the first and second half main bodies are coupled, such that the first and second half search coils are electrically connected to constitute the search coil.

4. The tendon diagnosis device of claim 1, wherein guide wheels are provided at two opposite ends of the main body based on the longitudinal direction, and
wherein the guide wheels come into contact with the outer surface of the tendon when the tendon diagnosis device is installed on the tendon, the tendon diagnosis device is installed to be suspended from the tendon in a state in which an interval is automatically defined between an inner surface of the hollow portion of the main body and the outer surface of the tendon, and the tendon diagnosis device moves along the tendon.

5. A bridge cable diagnosis system, which is configured to diagnose a bridge cable, the bridge cable diagnosis system comprising:
a tendon diagnosis device according to claim 1;
a traveling robot having a pulley around which a hoisting wire is wound to change a direction thereof, the traveling robot being fastened to the bridge cable and configured to move along the bridge cable and be fixed at a predetermined fixed position; and
a winch coupled to one end of the hoisting wire and configured to move the tendon diagnosis device by pulling or releasing the hoisting wire, wherein the tendon diagnosis device is installed on the inclined bridge cable, wherein the traveling robot having the pulley is installed at a position on the bridge cable above the tendon diagnosis device, wherein the other end of the hoisting wire is coupled to the tendon diagnosis device, wherein one end of the hoisting wire extends toward the traveling robot and is wound around the pulley to change the direction thereof, and then the other end of the hoisting wire is coupled to the winch to define an initially installed state, and wherein the traveling robot is moved toward an upper side of the bridge cable and moved to a fixed position at a predetermined height, and then the winch operates to adjust tension of the hoisting wire to operate the tendon diagnosis device at a predetermined separated diagnosis position while moving the tendon diagnosis device to the predetermined separate diagnosis position to monitor and recognize a state of the tendon, such that the state of the bridge cable is diagnosed.

6. The bridge cable diagnosis system of claim 5, wherein after the traveling robot is moved to the predetermined fixed position, a position of the traveling robot is fixed, the tendon diagnosis device is placed in a movable state, and the winch operates to impart tension to the hoisting wire and pull and hoist the tendon diagnosis device upward, such that the tendon diagnosis device is moved upward to the predetermined separate diagnosis position and operates to monitor a state of the tendon and diagnose a state of the bridge cable at the separate diagnosis position.

7. The bridge cable diagnosis system of claim 5, wherein after the traveling robot is moved to the predetermined fixed position, a position of the traveling robot is fixed, the tendon diagnosis device is placed in a movable state, and the winch operates to impart tension to the hoisting wire and pull and hoist the tendon diagnosis device upward, such that after the tendon diagnosis device is moved to a predetermined diagnosis initiation position, the winch operates to adjust the tension of the hoisting wire, such that the tendon diagnosis device operates to monitor a state of the tendon and diagnose a state of the bridge cable in a state in which the tendon diagnosis device moved downward from the diagnosis initiation position is positioned at the predetermined separate diagnosis position.

* * * * *